3,707,537
4-CHLORO-4,6-DIENE-6-HALO OR LOWER ALKYL STEROIDS
Richard Wrightman Kierstead, North Caldwell, N.J., assignor to Hoffmann-La Roche Inc., Nutley, N.J.
No Drawing. Continuation-in-part of application Ser. No. 658,602, Aug. 7, 1967, which is a continuation-in-part of application Ser. No. 604,143, Dec. 23, 1966, which in turn is a continuation-in-part of application Ser. No. 529,200, Feb. 23, 1966, all now abandoned. This application Jan. 8, 1969, Ser. No. 789,929
Int. Cl. C07c *169/20, 160/34, 173/00*
U.S. Cl. 260—239.55 C                   50 Claims

ABSTRACT OF THE DISCLOSURE 4-chloro-4,6-diene-6-halo- or lower alkyl-steroids are prepared via chlorination of corresponding compounds unsubstituted in the 4-position. After the chlorination compounds saturated at the 1- and 2-position can be unsaturated thereat and compounds containing a 3-oxo group can be converted to corresponding 3-hydroxy, 3-lower alkanoyloxy or 3-(1,2-alkylenedioxy) compounds. End-products of the invention are useful as either progestational agents, corticoid agents or androgenic/anabolic agents depending upon the particular derivative employed.

CROSS REFERENCES TO RELATED APPLICATIONS

This application is a continuation-in-part of Ser. No. 658,602, filed Aug. 7, 1967, now abandoned which in turn is a continuation-in-part of Ser. No. 604,143 filed Dec. 23, 1966, new abandoned which in turn is a continuation-in-part of Ser. No. 529,200 filed Feb. 23, 1966 now abandoned.

DETAILED DESCRIPTION OF THE INVENTION

This invention relates to novel chlorinated steroids and also to certain novel intermediates therefor. In particular, the novel halogenated steroids of this invention are characterized in the A and B rings by the features shown in the following partial formula

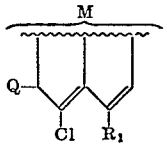

wherein $R_1$ is halogen of atomic weight less than 100 or lower alkyl; Q is oxo, hydroxy, lower alkanoyloxy or 1,2-alkylenedioxy of 2 to 4 carbon atoms; and M is the remaining portions of the A and B rings, as well as the C and D rings of the steroid molecule.

Steroidal compounds having the structural features shown in partial Formula I have been found to have valuable endocrinological properties.

Particularly valuable compounds of Formula I are those wherein the moiety M is of one of the following partial formulas

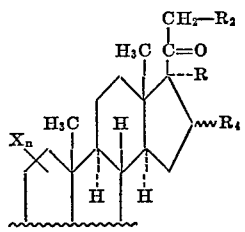

wherein $R_2$ is hydrogen or fluorine; $R_3$ is individually hydrogen, hydroxy, lower alkoxy, lower alkanoyloxy, difluoro- or dichloroacetyloxy, or lower alkyl; $R_4$ is individually hydrogen halomethyl, lower alkylidene or lower alkyl or, taken together with $R_3$, a moiety of the formula

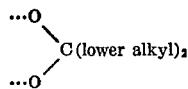

X is an unsaturation between the 1- and 2-position, 2-chloro or a 1α,2α-methylene moiety; and $n$ is a whole integer from 0 to 1;

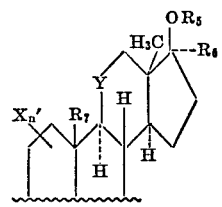

wherein $R_5$ is hydrogen or lower alkanoyl; $R_6$ is hydrogen, lower alkyl, mono-unsaturated lower alkyl or mono-unsaturated halo-lower alkyl; $R_7$ is hydrogen or methyl; X' is 2-chloro or an unsaturation between the 1- and 2-position; $n$ is a whole integer from 0 to 1; and Y is

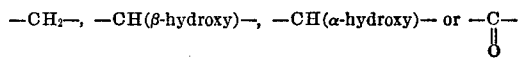

provided that when X' is an unsaturation, $R_7$ is methyl;

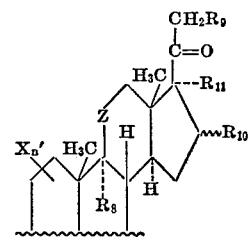

wherein $R_8$ is individually hydrogen or halogen of atomic weight less than 100; $R_9$ is individually hydrogen, hydroxy, the dihydrogen phosphate ester thereof or alkali metal salts thereof, or lower alkanoyloxy; $R_{10}$ is individually hydrogen, α-hydroxy, lower alkylidene, α-halo or lower alkyl; $R_{11}$ is individually lower alkanoyloxy, hydroxy or, taken together with $R_{10}$, a moiety of the formula

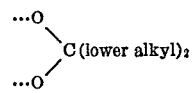

or, taken together with $R_9$, a moiety of the formula

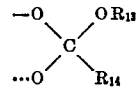

X' is an unsaturation between the 1- and 2-position or 2-chloro; $n$ is a whole integer from 0 to 1; Z is individually

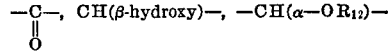

or when $R_8$ is chlorine, —CH($\beta$-chlorine)—, or, taken together with $R_8$, is an unsaturation between the 9- and 11-position or a 9,11-oxido moiety; $R_{12}$ is hydrogen or sulfonyloxy; and $R_{13}$ and $R_{14}$ is each independently lower alkyl.

As used herein the terminology halogen of atomic weight less than 100 comprehends bromine, chlorine and fluorine. Lower alkyl comprehends both straight and branched chain saturated hydrocarbon moieties having up to eight carbon atoms, such as methyl, ethyl, t-butyl, n-octyl or the like. Mono-unsaturated lower alkyl comprehends both lower alkenyl and lower alkynyl moieties such as allyl, 2-methylallyl, ethynyl and the like, and mono-unsaturated halo-lower alkyl comprehends bromo or chloro moieties such as 2-chloroethynyl, 3-chloro-2-methylallyl and the like. Lower alkoxy comprehends moieties which can be designated -O(lower alkyl); that is, moieties such as methoxy, ethoxy, and the like. Lower alkylidene indicates a straight or branched chain hydrocarbon moiety the terminal carbon atom of which has two free valence bonds such as methylene, isopropylidene and the like; methylene being especially preferred. Lower alkanoyl similarly comprehends residue of lower alkane carboxylic acids, such as acetyl, butyryl, caprylyl or the like and 1,2-alkylenedioxy of 2 to 4 carbon atoms comprehends moieties such as ethylenedioxy and the like. Alkali metal has its usual meaning and includes such metals as lithium, sodium and potassium. When used as part of the definition of $R_{10}$, halo comprehends chloro or fluoro. Sulfonyloxy comprehends lower alkyl sulfonyloxy moieties such as mesyloxy and arylsulfonyloxy moieties such as tosyloxy. Preferred compounds are those wherein $R_1$ is chlorine, fluorine or lower alkyl of up to four carbon atoms. Especially preferred are those compounds wherein $R_1$ is chlorine, fluorine or methyl. Also preferred are compounds wherein Q is acetoxy, ethylenedioxy or oxo.

Compounds which combine the features of partial Formulas I and III or IV wherein Y or Z is —CH(α-hydroxy)—

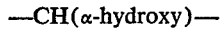

are useful as intermediates, for example, for corresponding compounds wherein Y or Z is

This conversion can be effected by known means. Similarly compounds which combine the features of partial Formulas I and II wherein $R_3$ is hydroxy can be esterified, and compounds which combine the features of partial Formulas I and III wherein $R_5$ is lower alkanoyl can be converted into the corresponding free hydroxy compounds. Thus, such compounds are useful as intermediates, as are other of the novel compounds of this invention as illustrated or described herein or as will be apparent to one skilled in the art of steroid chemistry.

The compounds of this invention can be prepared from compounds of the formula

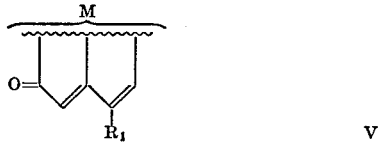

wherein $R_1$ and M have the same meaning as above via direct chlorination, except those compounds wherein the moiety represented by M, n is 1 and X or X' is an unsaturation between the 1- and 2-position (such unsaturation should be introduced after the chlorination is effected). Hydroxy groups present in the starting material molecule, i.e., comprehended by the moieties symbolized by M, can be esterified after the chlorination procedure; alternatively, the chlorination procedure can be effected on starting materials containing ester moieties. When chlorinating compounds wherein Y or Z is —CH(β-hydroxy)— it is preferable to protect the hydroxy group prior to chlorination, for example, via acylation to form the corresponding 11β-formyloxy or trifluoroacetoxy compound. After the chlorination the 11β-hydroxy compound can

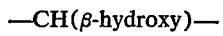

be generated by conventional means. When the 9-position is substituted with halogen such as fluorine, i.e., $R_8$ is other than hydrogen, chlorination may be undertaken without protecting the 11β-hydroxy moiety, if present. Products of partial Formulas I and III wherein $R_5$ is lower alkanoyl can be converted to corresponding compounds wherein $R_5$ is hydrogen via ketalization, if Q is oxo, followed by reduction with lithium aluminum hydride yielding compounds wherein $R_5$ is hydrogen and Q is 1,2-alkylenedioxy. The compound so-obtained, if desired, can be deketalized by conventional means, for example, by treatment with mineral acid. It is, however, preferred to make the latter compounds directly via chlorination of starting materials of partial Formulas III and V wherein $R_5$ is hydrogen. In addition to the foregoing, other known techniques can be used to protect labile groups prior to the chlorination procedure.

The chlorination procedure is part of this invention and is suitably effected by intramixing chlorine and a reaction medium which contains the starting steroid represented by the partial Formula V, preferably in solution. The chlorination proceeds in accordance with the following reaction sequence, the exact reaction route followed being determined by the particular process conditions employed.

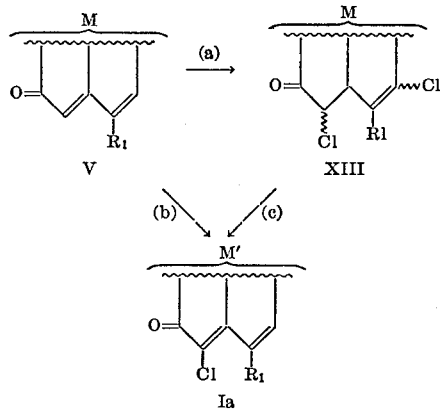

wherein $R_1$ and M are as previously defined.

Both the 4ε,7ε-dichloro-6-substituted-Δ⁵ compounds represented by the partial Formula XIII and the 4-chloro-6-substituted-4,6-diene compounds represented by the partial Formula Ia are endocrinologically useful as will be more fully described hereinafter. Further, the former compounds are useful as intermediates in the preparation of the latter compounds. Thus, depending on which class of products is sought to be prepared, viz, the $\Delta^5$ compounds of the partial Formula XIII or the $\Delta^{4,6}$ compounds of the partial Formula Ia, process step (a) or steps (a) and (c) or step (b) can be alternatively followed.

When it is desired to prepare the 4ε,7ε-dichloro-6-substituted-Δ⁵ compounds represented by the partial Formula XIII, the 4,6-diene starting steroids represented by partial Formula V are treated with chlorine in accordance with step (a). This step may be facilitated by the addition of a catalytic amount of anhydrous mineral or organic acid. Preferred are the hydrohalic acids, e.g., hydrogen chloride. The chlorination may be carried out in an inert organic reaction medium, for example, ethers such as lower alkyl ether, for example, ethyl ether or dioxane; chlorinated hydrocarbons such as chloroform, carbon tetrachloride, ethylene chloride or methylene chloride or the like. The chlorine can be introduced into the reaction medium by conventional techniques, e.g., a solution containing the chlorine can be introduced into the reaction mixture. A chlorine-containing lower alkanoic acid solution, for example, chlorine in propionic acid is suitable for this purpose. The treatment with chlorine is suitably effected at low temperatures, preferably between —40° C. and room temperature, more advantageously between —30° C. and 0° C.

A preferred class of the $\Delta^5$ compounds represented by the partial Formula XIII are those having 4ε,6,7ε-trichloro grouping. Especially preferred are the 4ε,6,7ε-trichloro-$\Delta^5$-compounds combined with structures of the Formula II wherein $R_2$ is hydrogen, $R_3$ is acetoxy, $n$ is 0 and $R_4$ is methylene or hydrogen. The 4ε,7ε-dichloro-6-substituted-$\Delta^5$ compounds represented by Formula XIII are endocrinologically useful per se as described hereinafter and are additionally useful as intermediates for the corresponding 4-chloro-6-substituted-4,6-diene compounds represented by Formula Ia.

The substituted-$\Delta^5$ compounds represented by the partial Formula XIII can be converted to the 4-chloro-6-substituted-4,6-diene compounds of Formula Ia. The conversion can be effected in accordance with step (c) of the above reaction sequence by treating the former compounds with a dehydrochlorinating agent under either neutral, basic or acidic conditions. Thus, the dehydrochlorination can be carried out under basic conditions, i.e., in the presence of a proton acceptor such as, for example, nitrogen-containing heterocyclic bases, e.g., pyridine, picoline or the like; or tri-lower alkylamines, e.g., triethylamine; and alkali metal inorganic bases such as alkali hydroxides, e.g., sodium hydroxide or alkali bicarbonates, e.g., sodium bicarbonate. When conducted under basic conditions a suitable solvent which may be employed for the conversion is the base itself. However, other solvents such as inert organic solvents, for example, ethers such as lower alkyl ethers, for example, ethyl ether or dioxane; chlorinated hydrocarbons, such as chloroform or carbon tetrachloride, may also be employed. Alternatively, the dehydrohalogenation can be effected under acidic conditions using an aqueous mineral acid, preferably a hydrohalic acid, e.g., hydrochloric acid. Preferred solvents for the reaction, when carried out under acidic conditions are water miscible ethers such as tetrahydrofuran, dioxane or glyme; water soluble amides such as dimethylformamide. The dehydrohalogenation can also be conducted in the absence of acid or base, i.e., under neutral conditions, by using for example, N,N-di-lower alkyl-lower alkanoyl-amides such as dimethylformamide or dimethylacetamide. Dimethylsulfoxide may also be suitably employed.

The dehydrochlorination carried out in accordance with step (c) of the reaction scheme is suitably conducted between temperatures of about 0° and 100° C., although a temperature range of 0 to 50° C. is preferred. If the steroid being subjected to the dehydrochlorination process is substituted with an alkanoyloxy moiety, the preferred proton acceptor is a nitrogen-containing heterocyclic base with pyridine being especially preferred.

Alternatively, if desired, the 4-chloro-6-substituted-4,6-diene compounds represented by the partial Formula Ia can be prepared directly from the 4,6-diene starting compounds of Formula V, without isolating the $\Delta^5$ compounds of the partial Formula XIII in accordance with step (b) of the reaction sequence. The conversion is effected by chlorinating the compounds of Formula V in the presence of a proton acceptor, for example, an N,N-di-lower alkyl-lower alkanoyl-amide, such as dimethylformamide or dimethylacetamide; a lower alkylene oxide such as ethylene oxide or propylene oxide, or the like; in a solvent such as lower alkanoic acids, e.g., acetic acid or propionic acid. It should be noted that when the 4-chloro-6-substituted-4,6-diene compounds represented by Formula Ia are prepared directly from the starting materials of Formula V, without isolating the $\Delta^5$ steroids of Formula XIII, the proton acceptor is initially present in the reaction medium when the chlorination is effected.

The proton acceptor can also serve as the solvent for the starting material represented by the partial Formula V. Alternatively, and preferably, the reaction medium can contain other solvents. These solvents can be any convenient inert organic solvents, for example, ethers such as lower alkyl ethers, for example, ethyl ether, or dioxane; chlorinated hydrocarbons such as chloroform or carbon tetrachloride; or the like. The chlorine can be introduced into the reaction mixture by conventional techniques, e.g., a solution containing the chlorine can be introduced into the reaction mixture. A chlorine-containing lower alkanoic acid solution, for example, chlorine in propionic acid, is suitable for this purpose. The treatment with chlorine is suitably effected at a low temperature, preferably between about $-40°$ C. and room temperature, more advantageously between about $-30°$ C. and about 0° C. Another embodiment is to treat the starting reactant of Formula V with chlorine in carbon tetrachloride using chloroform as a solvent for the starting material. The reaction is carried out preferably between about 0° C. and room temperature, followed by removal of the solvent and treatment with a heterocyclic nitrogen-containing base such as pyrindine, picoline or the like.

The above-described chlorination procedure is a part of this invention. The facile manner in which it can be conducted and the good yields obtainable therewith are notable inasmuch as conventional processes utilizing 4-chloro-$\Delta^{4,6}$ or 4-chloro-6-substituted-$\Delta^4$ steroids have failed to yield detectable, appreciable amounts of 4-chloro-6-$R_1'$-4,6-diene-3-one steroid product, wherein $R_1'$ is chlorine.

Compounds wherein Q is oxo can be converted into compounds wherein Q is 1,2-alkylenedioxy subsequent to chlorination via conventional means, for example, via reaction with a 1,2-alkylene glycol in the presence of an acid catalyst such as para-toluene-sulfonic acid. For example, ethylene glycol can be used and yields a compound wherein Q is ethylenedioxy. Also, compounds wherein Q is oxo can be converted into compounds wherein Q is hydroxy by conventional reduction means such as treatment with lithium aluminum tri-t-butoxyhydride or sodium borohydride. In those starting materials containing a 20-oxo moiety it is preferable to hinder this moiety prior to the reduction in order to prevent said 20-oxo moiety from being reduced. Such hindrance can be effected by known means, for example, by introducing an ester moiety in the 17α-position or by formation of the bis-methylenedioxy derivative. Furthermore, compounds wherein Q is hydroxy can be converted into compounds wherein Q is lower alkanoyloxy by conventional lower alkanoylating means as lower alkanoic anhydride in pyridine. Moreover, compounds wherein $n$ is 0 can be converted into compounds wherein $n$ is 1 and X or X' is an unsaturation between the 1- and 2-position by means known per se such as treatment with selenious acid. Also, as a by-product of the 4-chlorination procedure of this invention of compounds of the formula

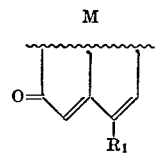

Vb wherein $R_1$ and M have the same meaning as above and in the moiety M, $n$ is 0;

it is possible to obtain compounds of the formula

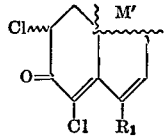

Vc wherein $R_1$ has the same meaning as above and M' has the same meaning as M absent the carbon atoms at the 1- and 2-position.

Such 2,4-dichloro compounds of Formula Vc, which can also be obtained by direct chlorination of a compound of Formula I wherein $n$ is 0, can be converted into compounds of Formula I wherein $n$ is 1 and X or X' is an unsaturation between the 1- and 2-position by dehydrochlorination means known per se such as by treatment with lithium chloride in dimethylformamide.

Compounds which combine the features of partial Formulas I and II wherein $R_1$, Q, $R_2$, $R_3$, $R_4$, X and $n$ have the same meaning as above are useful as progestational agents. When $R_3$ is hydrogen or hydroxy, the compounds can be administered parenterally, and when $R_3$ is lower alkoxy, lower alkanoyloxy, difluoro- or dichloroacetyloxy or lower alkyl, the compounds can be administered orally or parenterally. Preferred compounds are those wherein $R_1$ is chlorine or fluorine; Q is oxo, hydroxy, acetoxy or ethylenedioxy; $R_2$ and $n$ have the same meaning as above; $R_3$ is lower alkoxy, lower alkanoyloxy or lower alkyl; $R_4$ is hydrogen, methylene, ethyl or methyl and X is an unsaturation between the 1- and 2-position.

Compounds which combine the features of partial Formulas I and III wherein Q, $R_1$, $R_5$, $R_7$, $n$ and Y have the same meaning as above, $R_6$ is mono-unsaturated lower alkyl or mono-unsaturated halo-lower alkyl and X' is an unsaturation between the 1- and 2-position are also useful as progestational agents. These compounds can be administered orally or parenterally. Preferred compounds of this group are those wherein $R_1$ is chlorine or fluorine, Q is oxo, hydroxy, acetoxy or ethylenedioxy, $R_5$ is hydrogen or lower alkanoyl, $R_7$ is hydrogen or methyl, Y is —$CH_2$— and $R_6$ is ethynyl, 2-chloroethynyl, allyl, 2-methallyl, or 1-propynyl.

Those compounds which combine the features of partial Formulas I and III wherein $R_1$, Q, $R_5$, $R_7$, $n$ and Y have the same meaning as above and $R_6$ is hydrogen or lower alkyl and X' is an unsaturation between the 1- and 2-position are useful as androgenic/anabolic agents. Of these compounds those wherein $R_6$ is hydrogen can be administered parenterally and those wherein $R_6$ is lower alkyl can be administered orally or parenterally. Of these compounds useful as androgenic/anabolic agents those wherein $R_1$ is chlorine or fluorine; Q is oxo, hydroxy, acetoxy or ethylenedioxy; $R_5$ is hydrogen; $R_6$ is lower alkyl; $R_7$ is hydrogen or methyl; $n$ is 0 and Y is —$CH_2$— are preferred. If a high ratio of anabolic to androgenic activity is desired, such compounds wherein $R_7$ is hydrogen are preferred.

Those compounds which combine features of partial Formulas I and IV wherein $R_1$, Q, $R_8$, $R_9$, $R_{10}$ and $R_{11}$ have the same meaning as above are useful as corticoid agents when $n$ is 0 or when $n$ is 1, X' is an unsaturation between the 1- and 2-position, and when Z is —$CH_2$—, —CO—, —CH($\beta$-hydroxy)— or —CH($\beta$-chlorine)—. Those compounds wherein Z is —$CH_2$— are useful as mineralocorticoids and those compounds wherein Z is —CO—, —CH($\beta$-hydroxy)— or —CH($\beta$-chlorine)— are useful as glucocorticoids, i.e., as antiinflammatory and thymolytic agents. The compounds useful as mineralocorticoids can be administered orally or parenterally, and those compounds useful as anti-inflammatory and thymolytic agents can be administered parenterally, or particularly when Z contains $\beta$-hydroxy or $\beta$-chlorine, topically. of those compounds useful as anti-inflammatory and thymolytic agents especially preferred are those wherein $R_1$ is chlorine or fluorine; Q is oxo, hydroxy, acetoxy or ethylenedioxy; $R_8$ is halogen; $R_9$ is the dihydrogen phosphate ester or lower alkanoyloxy; $R_{10}$ is $\alpha$-hydroxy, methylene, methyl or ethyl; $R_{11}$ is hydroxy, or taken together with $R_{10}$, 2,2-isopropylenedioxy; $n$ is 0 and Z is —CH($\beta$-hydroxy)—.

Those compounds combining the features of partial Formula I and partial Formuals II, III or IV which are not endocrinologically useful, as described above, are useful as intermediates for the preparation of such endocrinologically useful compounds as described herein. The compounds of this invention which combine the features of partial Formula I and partial Formulas II, III or IV which are useful as progestational or corticoid agents are marked by an especially high degree of activity. Also, those compounds indicated above to be the preferred compounds among the endocrinologically useful compounds particularly possess a high degree of activity.

Compounds which combine the features of partial Formula XIII or other oxo derivatives as defined by the variable Q and partial Formula II wherein $R_1$, $R_2$, $R_3$, $R_4$, X and $n$ have the same meaning as above are useful as progestational agents. Compounds which combine the features of partial Formula XIII or other oxo derivatives as defined by the variable Q and partial Formula IV wherein $R_1$, $R_8$, $R_9$, $R_{10}$, $R_{11}$ have the same meaning as above are useful as corticoid agents when $n$ is 0 or when $n$ is 1, X' is an unsaturation between the 1- and 2-position, and when Z is —$CH_2$—, —CO—, —CH($\beta$-hydroxy)— or —CH($\beta$-chlorine)—. Those compounds wherein Z is —CO—, —CH($\beta$-hydroxy)— or —CH($\beta$-chlorine)—are useful as glucocorticoids, i.e., as antiinflammatory and thymolytic agents.

The 4,7-dichloro-6-substituted-$\Delta^5$ compounds which combine the features of partial Formulas II and XIII or partial Formulas IV and XIII can be pharmaceutically administered in a similar fashion as described above, as the corresponding steroids having the 4-chloro-6-substituted-4,6-diene partial steroid configuration of Formula I.

In addition to the 4,6-disubstituted-4,6-dienes of Formula I described above, certain intermediates useful in their preparation are novel and are a part of this invention. Such compounds are, for example, those of the formula

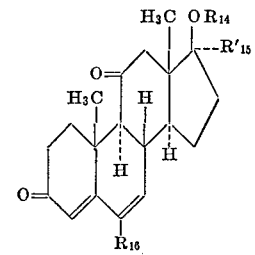

VI wherein $R_{14}$ is hydrogen or lower alkanoyl; $R'_{15}$ is lower alkyl; and $R_{16}$ is a halogen of atomic weight less than 100.

The compounds of Formula VI can be prepared by a three-step procedure starting from compounds of the formula

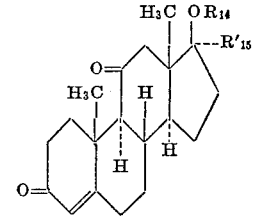

VII wherein $R_{14}$ and $R'_{15}$ each has the same meaning as above.

In the first step of this procedure, the compound of Formula VII is dehydrogenated according to methods known per se, for example, with 2,3-dichloro-5,6-dicyanobenzoquinone, to yield a compound of the formula

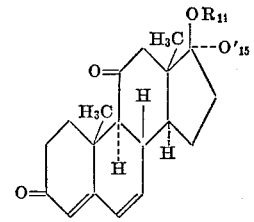

VIII wherein $R_{14}$ and $R'_{15}$ each has the same meaning as above.

The compound of Formula VIII is then selectively oxidized, once again according to known procedures, for example, with monoperphthalic acid, to yield a compound of the formula

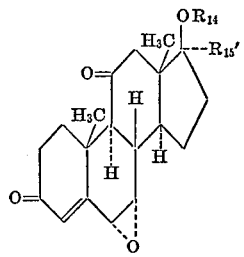

IX wherein $R_{14}$ and $R'_{15}$ each has the same meaning as above.

Treatment of the compound of Formula IX in acidic solution, such as acetic acid, with a hydrogen halide then yields the desired 6-halo-4,6-diene compound of Formula VI. In a like manner other 6-halo-4,6-diene starting materials of Formula V can be prepared.

Besides compounds of Formulas VI, VIII and IX, among other novel intermediate compounds within the scope of this invention are those of the formula

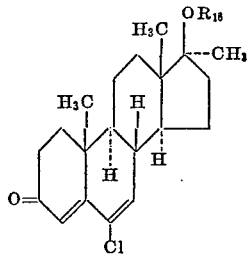

X wherein $R_{16}$ is hydrogen or acetyl.

In addition to being useful as intermediates for corresponding 4,6-dichloro-4,6-diene compounds of Formula I, compounds of Formula X are endocrinologically useful. The compound of Formula X wherein $R_{16}$ is hydrogen is useful as an anabolic and androgenic agent, whereas the compound of Formula X wherein $R_{16}$ is acetyl is useful as an antiandrogenic agent. The latter compound can be converted into the former which can be prepared from the corresponding 6-chloro-3-methoxy-3,5-diene compound via treatment with t-butyl chromate, manganese dioxide or the like oxidizing agent. In the same manner other 6-chloro-4,6-dien-3-one compounds of Formula V can be prepared from corresponding 6-chloro-3-lower alkoxy-3,5-diene compounds which in turn can be obtained from 6-chloro-4-en-3-one compounds via treatment of the latter with tri(lower alkyl)-orthofoformate. The procedures described in this paragraph are known and can be conducted according to the known techniques.

Compounds which combine the features of partial Formulas I and II wherein $R_3$ is hydrogen can be converted into compounds of Formulas I and II where $R_3$ is hydroxy. In one procedure a compound of Formulas I and II wherein $R_3$ is hydrogen and Q is oxo is treated with acetic anhydride and perchloric acid yielding the enol acetate compound of the formula

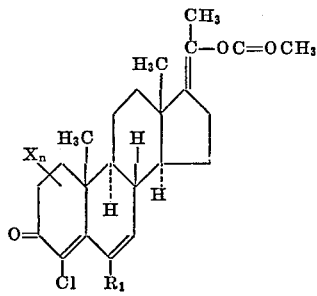

XI wherein $R_1$, X and $n$ have the same meaning as above.

A compound of Formulas I and II wherein $R_3$ is hydroxy can then be obtained by treating the enol acetate of Formula XI with unbuffered peracetic acid. Via another procedure a compound of Formula XI is treated with buffered peracetic acid yielding a compound of the formula

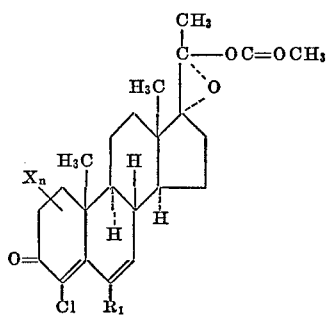

XII wherein $R_1$, X and $n$ have the same meaning as above.

Via acidic or basic hydrolysis a compound of Formula XII can be converted to a compound of Formulas I and II wherein $R_3$ is hydroxy. The above procedures utilizing compounds of Formulas XI and XII as intermediates are known reaction procedures and can be conducted according to known techniques.

In still another aspect, this invention relates to a method and novel intermediates prepared thereby which is particularly suitable for preparing corticoid type compounds which are formed by combining the structures of partial Formulas I and IV wherein $R_1$, Q, $R_8$, $R_9$, Z, X' and $n$ are defined as aforesaid; $R_{11}$ is hydroxy; and $R_{10}$ is methylene. The starting materials which can be employed to prepare these 16-methylene, 17-hydroxy corticoid type compounds are characterized by having a structure of the partial Formula V and further defined so as the variable $R_{11}$ is hydroxy and $R_{10}$ is hydrogen, such as, for example, 6-chloro-17,21-dihydroxy-pregna - 4,6 - diene - 3,11,20-trione-21-acetate. The process comprises first introducing a $\Delta^{16}$ bond into the starting steroid reactant. The $\Delta^{16}$ bond can be introduced into the ring system by forming the C-20 semicarbazone by known means, dehydrating the thus obtained semicarbazone intermediate by means of strong acid, preferably trifluoroacetic acid, then removing the semicarbazide moiety by means of pyruvic acid in a 50% aqueous acetic acid solution and thus regenerating the 20-oxo group. A 16-methyl group is next introduced into the system by a sequential process of reacting the thus obtained $\Delta^{16}$-4,6-diene-steroid with diazomethane and then pyrolyzing the thus obtained intermediate. The reaction is effected by known means, i.e., by adding a solution of diazomethane conveniently prepared from nitrosomethyl urea in ether to the steroid reactant in an inert organic reaction medium, such as an ether, preferably tetrahydrofuran. The reaction can conveniently be conducted at room temperature. The 16-methyl-$\Delta^{16}$-4,6-diene-6-substituted corticoid is obtained by pyrolyzing the 16,17-methyleneazo intermediate by heating at a temperature of about 150° C. to about 200° C. The $\Delta^{16}$-16-methylcorticoid is then chlorinated employing methods described earlier in this application. The chlorination can be conducted so as to yield directly the $\Delta^{4,6,16}$-6-substituted-4-chloro corticoids or 4,7-dichloro-$\Delta^{5,16}$-6-substituted-corticoids in accordance with earlier described methods (viz steps (a), (b) and (c) of the reaction scheme). The latter compounds are next reacted by epoxidizing the $\Delta^{16}$ bond so as to form the corresponding 16α,17α-oxido derivative. The conversion is effected by means of a suitable epoxidizing agent such as peroxytrifluoroacetic acid in a suitable inert organic solvent, preferably a chlorinated hydrocarbon such as methylene chloride. The peroxytrifluoroacetic acid solution may be prepared in situ by adding hydrogen peroxide to trifluoroacetic acid anhydride. The reaction can be conveniently conducted at a temperature range of about −20° C. to +25° C. The resulting 4,7-dichloro-Δ⁵-6-substituted-16α,17α-oxido derivatives are treated with pyridine to give the corresponding 4-chloro-Δ⁴,⁶-6-substituted-16α,17α-oxido intermediates. The desired 16-methylene-17-hydroxy corticoid end-product having the partial Formula IV and further characterized by $R_{10}$ as methylene and $R_{11}$ as hydroxy is then obtained by cleaving the 16α,17α-oxido such as trifluoroacetic acid in an anhydrous inert organic solvent, preferably a hydrocarbon such as benzene.

When preparing certain pregnane-type compounds, viz., those formed by combining the structures of Formulas I and II wherein X, n, $R_1$ and $R_2$ are defined as aforesaid; $R_3$ is hydroxy and $R_4$ is methylene, it has been found preferable to introduce the 17-hydroxy moiety after chlorination of the starting reactants of Formula V has been effected. An especially preferred method is to employ as a starting reactant, the corresponding 16-methylene-17-alkanoyloxy derivative. Thus, in one embodiment, 17α-acetoxy-4,6-dichloro-16-methylenepregna-4,6-diene - 3,20-dione is first selectively reduced to yield the corresponding C–3 hydroxy derivative using lithium aluminum tri-tertiary butoxyhydride, in ether solvent, e.g., tetrahydrofuran at room temperature. The thus obtained 17α-acetoxy-4,6-dichloro-16-methylene-pregna-4,6-diene - 3 - hydroxy-20-one is then hydrolyzed using an alkali metal hydroxide, e.g., potassium hydroxide in a lower alkanol solvent, preferably methanol at room temperature to yield the corresponding 3,17-dihydroxy derivative. If desired, the C–3 oxo group can be regenerated by oxidation with a suitable oxidizing agent, such as manganese dioxide in an inert organic solvent, preferably, a chlorinated hydrocarbon, such as chloroform at room temperature to yield the desired 3,20-diketo-16-methylene-17α-hydroxy-pregnane derivative. Further, it has been found that 16-methylene-17-alkanoyloxy-pregna-4,6-dienes which are additionally unsaturated at the C–1 position, e.g., 17-acetoxy-4,6-dichloro-16-methylenepregna-1,4,6-triene-3,20 - dione can be converted to the corresponding 16-methylene-17α-hydroxy derivative directly by hydrolyzing with an alkali metal hydroxide without first reducing the C–3 oxo moiety as was found necessary with pregnane-type compounds discussed above, which are saturated at the C–1 position.

The starting materials of partial Formula V represent a known class of compounds which can be prepared, for example, by insertion of an unsaturation between the 6- and 7-position of corresponding 3-oxo-Δ⁴-6-substituted compounds. The preparation of certain starting materials of partial Formula V is specifically illustrated herein and other starting materials of partial Formula V can be prepared in the same manner.

Compounds which combine the features of partial Formulas I and IV wherein $R_8$ is other than hydrogen can be prepared from compounds which combine the features of partial Formulas I and IV wherein Z is

—CH(α-OR$_{12}$)— and $R_8$ is hydrogen via means known per se. For example, the 11α-hydroxy group can be converted to a sulfonyloxy moiety such as mesyloxy, tosyloxy or the like, and such 11-sulfonyloxy compound can then be converted to the corresponding Δ⁹⁽¹¹⁾-compound which upon treatment with a brominating agent such as N-bromoacetamide is converted into the corresponding 9α-bromo-11β-hydroxy compound. Alternatively, treatment of the Δ⁹⁽¹¹⁾-compound with a chlorinating agent such as a solution of chlorine in carbon tetrachloride yields a 9α,11β-dichloro compound. Treatment of the 9α-bromo-11β-hydroxy compound with a dehydrobrominating agent such as an alkali metal hydroxide solution yields the corresponding 9,11β-oxido compound which upon treatment with hydrogen fluoride is converted into the corresponding 9α-fluoro-11β-hydroxy compound. Starting from compounds wherein Z is —CH(β-OR$_{12}$)— the same Δ⁹⁽¹¹⁾-compound can be prepared via dehydration of starting materials wherein $R_{12}$ and $R_8$ are both hydrogen, using for example, thionyl chloride in pyridine. These various methods of modifying the 9- and 11-position are known per se, and the known techniques are applicable to the compounds of this invention.

The compounds of this invention are characterized by a high degree of endocrinological usefulness with a selectivity of action characterized by minimal side effects. Thus, the endocrinologically useful compounds of this invention, i.e., those of partial and complete Formulas I–IV and X indicated to be endocrinologically useful above, can be administered internally, for example, orally or parenterally, with dosage adjusted to individual requirements, in the form of conventional pharmaceutical preparations; for example, they can be administered in conventional pharmaceutical solid or liquid forms, such as, tablets, pills, capsules, solutions, suspensions, emulsions, or the like. These pharmaceutical preparations can contain conventional pharmaceutical carriers and excipients, such as, water, talc, corn starch, polyalkylene glycols, emulsifying agents, buffering agents, agents for the adjustment of osmotic pressure, Vaseline, and the like. Though it is preferred to administer the endocrinologically useful compounds of this invention internally, the endocrinologically useful compounds of this invention having progestational, i.e., those of partial Formulas I and II or III, or anti-inflammatory, i.e., those of partial Formulas I and IV, usefulness can also be administered topically. For this purpose, i.e., topical administration, these compounds can be administered in conventional topical administration forms such as ointments or creams, in combination with conventional topical carriers such as petrolatum, stearic acid or the like. Also compositions containing an active ingredient of this invention can be subjected to conventional pharmaceutical processes, such as, sterilization or the like. Also, the pharmaceutical compositions of this invention can contain other active ingredients. Moreover, the endocrinologically active compounds can be administered as feed additives, and for this purpose can be admixed with conventional animal feeds or conventional animal feed premixes. Though as indicated dosage of the endocrinologically useful compounds of this invention should be adjusted to individual needs, compounds useful as progestational agents, i.e., those of partial Formulas I and II, can be administered internally in daily dosage regimens of from about 0.005 mg./kg. to about 0.15 mg./kg. per day. Also, compounds useful as androgenic and anabolic agents, i.e., those of partial Formulas I and III and of Formula X, can be administered internally in daily dosage regimens of from about 0.15 mg./kg. to about 1.5 mg./kg. per day. Moreover, compounds useful as anti-inflammatory and thymolytic agents, i.e., those of partial Formulas I and IV, can be administered internally in daily dosage regimens of from about 0.005 mg./kg. to about 0.3 mg./kg. per day. Dosages can be administered in unit or divided dosage forms.

The usefulness of the compounds exhibiting endocrinological activity is indicated in animals, for example, the progestational compounds of this invention, when administered to estrogen primed immature female rabbits for five days show the presence of progestational activity by a secretory type endometrial response observed on histological sections prepared from the rabbits' uteri and examined microscopically. A maximal response is demonstrated by progesterone at 200 mcg./day for five days. As exemplary of the progestational compounds of this invention there can be named 17α-acetoxy-4,6-dichloro-pregna-4,6-diene-3,20-dione;
17α-acetoxy-4,6-dichloro-3,3-ethylenedioxy-pregna-4,6-diene-20-one;
17α-acetoxy-4,6-dichloro-pregna-1,4,6-triene-3,20-dione;
17α-acetoxy-4,6-dichloro-pregna-4,6-dien-3β-ol-20-one;
3β,17α-diacetoxy-4,6-dichloro-pregna-4,6-diene-20-one;

4,6-dichloro-3β,17α-dihydroxy-16-methylenepregna-4,6-dien-20-one 17-acetate;

4,6-dichloro-17α-acetoxy-16-methylenepregna-4,6-dien-3,20-dione;

4,6-dichloro-3β,17α-diacetoxy-16-methylenepregna-4,6-diene-20-one;

4,6-dichloro-17α-acetoxy-16-methylenepregna-1,4,6-triene-3,20-dione;

4ξ,6,7ξ-trichloro-17α-hydroxypregn-5-ene-3,20-dione acetate;

4ξ,6,7ξ-trichloro-17α-hydroxy-16-methylenepregn-5-ene-3,20-dione acetate and 4,6-dichloro-17β-hydroxy-19-nor-17α-pregna-4,6-diene-20-yn-3-one, which when examined in two rabbits each showed progestational activity at 10 mcg./kg./day s.c. or less. Mineralocorticoid activity is shown by a procedure wherein male bilaterally adrenalectomized rats weighing approximately 125–150 g. are fasted and deprived of drinking water overnight. In the morning the animals are weighed and then injected with a compound at 50 mg./kg. s.c. and 5 ml./100 g. of 0.9% sodium chloride s.c. at a separate site. There is a control group getting vehicle and saline load only. After injection the animals are placed in metabolism cages and their urine is collected for six hours. The urine is then analyzed for sodium and potassium content by a flame photometer. The results are expressed as percent difference of sodium and potassium excretion from controls. In this procedure desoxycorticosterone acetate at 0.25 mg./kg. gives an average sodium difference of −50 to −60%. Glucocorticoid activity is shown by a procedure wherein male rats weighing 50–60 g. each are bilaterally adrenalectomized and injected at a dose of 2.5 mg./rat/day s.c. for three consecutive days with the compound suspended in an aqueous suspending vehicle. Injections are begun on the day of adrenalectomy and the animals are autopsied on the fourth day. Thymus weight is determined and compared to that of the control animals which received the suspending vehicle alone. In this procedure hydrocortisone at 0.5 mg./day gave about a −58% change in thymus weight as compared to controls. Illustrative of the compounds of this invention are 4,6-dichloro-17α,21-dihydroxypregna-4,6-dien-3,11,20-trione 21-acetate and 4-chloro-6-fluoro-17,21-diyhydroxy-pregna-4,6-diene-3,11,20-trione 21-acetate which in this procedure are more than twice as potent as cortisone. Androgenic and/or anabolic activity is shown in a procedure wherein five castrated rats weighing approximately 40–50 g. each are given subcutaneous injections of the compound suspended in sesame oil, whereas a control group of five rats is administered the sesame oil vehicle only. After seven days of treatment all animals are autopsied and weights of their prostates and levator ani muscles are determined. The weight of their levator ani as compared to the control group of rats is the criterion used for determining anabolic activity. Tetosterone propionate at 0.1 mg./day gives approximately a 111% increase in the levator ani muscle weight as compared to the control group. In this procedure, as exemplary of the androgenic/anabolic compounds of this invention 4,6-dichloro-17β-hydroxy-17α-methyl-androsta-4,6-dien-3-one gives an increase in levator ani weight. Prostate change is the criterion for androgenic activity. Testosterone propionate at 0.1 mg./day gives approximately a 595% increase in the weight of the prostate as compared to the control group.

Besides those described above other of the intermediates useful in the preparation of the end-products of this invention also are endocrinologically useful, for example, 17α-acetoxy-6-chloro-16β-methylpregna-4,6-diene-3,-20-dione is useful as a progestational agent and can be used in the same manner as are the progestational agents described above.

The following examples are illustrative of this invention but not limitative thereof. Most of the starting material compounds are known compounds or members or known classes of compounds. In any event, the starting materials can be prepared by known methods as, for example, those in certain instances exemplified in the following examples. All temperatures in the examples are stated in degrees centigrade.

Example 1

A solution of 25 g. of 17β-hydroxy-17α-methyl-androst-4-ene-3,11-dione in 125 ml. of anhydrous pyridine and 125 ml. of acetic anhydride was heated under reflux for 4 hrs. The reaction mixture was then cooled and diluted with 1 liter of ether-methylene chloride mixture (2.5:1). The organic solution was then washed twice with 1 N hydrochloric acid solution, twice with 5% sodium bicarbonate solution and once with water. The organic layer was dried ($Na_2SO_4$) and was then concentrated under reduced pressure. The residue was then passed through a short column of synthetic magnesia-silica gel (Florisil, available from The Floridin Company, Box 989, Tallahassee, Fla.), the product being eluted with benzene. The benzene eluate was concentrated under reduced pressure and the residue was crystallized from ether-hexane giving 17β - acetoxy-17α-methyl-androst-4-ene-3,11-dione, M.P. 188–190°, $[\alpha]_D^{25}+170°$ (c. 1.0 in $CHCl_3$).

A slow stream of hydrogen chloride was bubbled for about 10 seconds through a solution of 10.0 g. of 17β-acetoxy-17α-methyl-androst-4-ene-3,11-dione in 150 ml. of anhydrous dioxane. In a separate flask, a slow stream of anhydrous hydrogen chloride was bubbled for about 10 seconds through a solution of 6.95 g. of 2,3-dichloro-5,6-dicyanobenzoquinone in 130 ml. of anhydrous dioxane. The two dioxane solutions were then mixed together and hydrogen chloride was bubbled through the so-formed mixture for about 90 seconds. The reaction mixture was then allowed to stand at room temperature for 35 minutes, and was then filtered from the resulting precipitate. The filtrate was concentrated to about 50 ml. under reduced pressure and was then diluted with 1 liter of ether-methylene chloride mixture (2.5:1). The organic solution was separated, washed twice with dilute sodium hydroxide (1 N) solution and once with water. The organic layer was dried ($Na_2SO_4$) and evaporated under reduced pressure. The residue was filtered through a short column of synthetic magnesia-silica gel (Florisil, available from The Floridin Company, Box 989, Tallahassee, Fla.), the product, 17β-acetoxy-17α-methyl-androsta-4,6-diene-3,11-dione, being eluated with benzene and ethyl acetate. The eluates were combined and evaporated. The residue was crystallized from methylene chloride-ether giving 17β-acetoxy-17α-methyl-androsta - 4,6 - diene - 3,11 - dione, M.P. 182–184°, $[\alpha]_D^{25}+226°$ (c. 1.0 in $CHCl_3$).

Example 2

To a solution of 4.7 g. of 17β-acetoxy-17α-methyl-androsta-4,6-diene-3,11-dione in 940 ml. of methylene chloride and 225 ml. of ether was added 125 ml. of a 0.8 molar solution of mono-perphthalic acid in ether. The reaction mixture was allowed to stand at room temperature for 41 hrs. and was then diluted with 1.4 liters of ether. The organic layer was separated, washed twice with 10% sodium carbonate solution, twice with water and twice with brine. The organic layer was dried ($Na_2SO_4$) and was then concentrated under reduced pressure. The residue was crystallized from methylene chloride-ether giving crude product, 17β - acetoxy - 17α-methyl-6α,7α-epoxy-androst-4-ene-3,11-dione which upon further crystallization from methylene chloride-ether melted at 233.5–237°, $[\alpha]_D^{25}+142°$ (c. 0.75 in $CHCl_3$).

Example 3

Hydrogen chloride was bubbled for 10 minutes through a solution (room temperature) of 2.34 g. of 17β-acetoxy-17α - methyl - 6α,7α - epoxy-androst-4-ene-3,11-dione in 110 ml. of glacial acetic acid. The solution was then allowed to stand at room temperature for an additional 3 hr., and was then diluted with 700 ml. of cold water. The resulting mixture was then extracted three times with ether-methylene chloride mixture (2.5:1). The organic layers were washed twice with 5% sodium bicarbonate solution, once with water and once with brine. The combined organic layers were dried ($Na_2SO_3$) and concentrated under reduced pressure. The residue was chromatographed on 30 g. of synthetic magnesia-silica gel (Florisil, available from The Floridin Company, Box 989, Tallahassee, Fla.). The column was eluted with benzene-ethyl acetate and the resulting product was crystallized from methylene chloride-ether giving 17β-acetoxy - 6 - chloro-17α-methyl-androsta-4,6-diene,3,11-dione which upon crystallization from ether-hexane melted at 137.3–139°, $[\alpha]_D^{25}+209°$ (c. 0.71 in $CHCl_3$).

Example 4

To a cooled (0°) solution of 2.03 g. of 17α-acetoxy-6-chloro-pregna-4,6-diene-3,20-dione in 20 ml. of dimethylformamide and 10 ml. of ether was added 5.39 ml. of a 1.015 M solution of chlorine in propionic acid. The mixture was allowed to stand at 0° for 12 hours whereupon an additional 0.3 ml. of the chlorine solution was added and the mixture was then allowed to stand for an additional 2 hours at 0°.

The reaction mixture was then poured into 300 ml. of water and the resulting mixture was extracted three times with ethermethylene chloride mixture (2.5:1). The organic layers were washed once with 5% sodium bicarbonate solution and once with brine. The combined organic layers were then dried ($Na_2SO_4$) and evaporated under reduced pressure. The residual oil was triturated in the presence of ethyl acetate giving crude 17α-acetoxy-4,6-dichloro-pregna-4,6-diene-3,20-dione which upon further crystallization from chloroform-ethyl acetate formed colorless crystals of 17α-acetoxy-4,6-dichloro-pregna-4,6-diene-3,20-dione, M.P. 237–239.5°, $[\alpha]_D^{25}+135°$ (c. 1.03 in $CHCl_3$).

According to the above procedure, chlorination of:

(a) 21 - acetoxy-11β,17α-dihydroxy-6-chloro-pregna-4,6-diene - 3,20-dione yields 21-acetoxy-11β,17α-dihydroxy-4,6-dichloro-pregna-4,6-diene-3,20-dione.

(b) 21 -acetoxy - 11β,17α - dihydroxy-6,9α-difluoro-16α-methyl - pregna-4,6-diene-3,20-dione yields 21-acetoxy-11β,17α - dihydroxy-4-chloro-6,9α-difluoro-16α-methyl-pregna-4,6-diene-3,20-dione.

Example 5

To a cold (0°) solution of 1.0160 g. of 6-chloro-17α-acetoxypregna-4,6-diene-3,20-dione in 10 ml. of alcohol free chloroform was rapidly added (at 0°) 3.4 ml. of a 0.817 M solution of $Cl_2$ in dry carbon tetrachloride. This solution was stored at 0° for 18 hrs. The solvent was then removed under reduced pressure and the residue was treated with 25 ml. of heptane and the solvent was again removed under reduced pressure. This operation was repeated a second time. The residue was then treated with 4 ml. of dry pyridine and the resulting solution was heated on a steam bath for 5 minutes. The solution was then allowed to stand at room temperature overnight (pyridine hydrochloride precipitated from the reaction mixture). To the pyridine solution was then added 50 ml. of chloroform and the resulting solution was twice extracated, each time with 50 ml. of 1 N hydrochloric acid. The aqueous layer was then extracted with 25 ml. of ether. The organic layers were combined, dried over magnesium sulfate and evaporated under reduced pressure. The residue was treated with 25 ml. of heptane which was evaporated under reduced pressure. This operation was repeated a second time giving crude 4,6-dichloro-17α-acetoxy-pregna-4,6-diene-3,20-dione which was recrystallized twice from methylene chloride-ethylacetate yielding crystals, M.P. 241–243°.

Example 6

To a cooled (−2°) solution of 6-chloro-17α,21-dihydroxy-pregna - 4,6-diene-3,11,20-trione 21-acetate in 16 ml. of dry dimethylformamide and 10 ml. of ether was added 4.0 ml. of a 1.05 M solution of chlorine in propionic acid. The reaction mixture was allowed to stand at −2° for 10 hours and then at room temperature for 5 hours. The reaction mixture was then poured into 100 ml. of water and was extracted with methylene chloride. The organic layer was washed twice with 5% sodium bicarbonate solution and once with brine. The organic solution was then dried over sodium sulfate and evaporated. The residue was crystallized three times from methylene chloride-ether giving 4,6-dichloro-17α,21-dihydroxypregna-4,6-dien-3,11,20-trione 21-acetate, M.P. 257.5–259.5°, $[\alpha]_D^{25}+398.4°$ (c. 0.51 in $CHCl_3$).

Example 7

To a cooled (0°) solution of 0.60 g. of 17β-acetoxy-6-chloro-17α-methyl-androsta-4,6-diene-3,11-dione in 6 ml. of dimethylformamide and 3 ml. of ether was added 2.0 ml. of a 0.98 M solution of chlorine in propionic acid. The reaction mixture was allowed to stand at 0° for 12 hours. The reaction mixture was then diluted with 100 ml. of water and the resulting mixture was extracted three times with ether-methylene chloride mixture (2.5:1). The organic layers were washed once with 5% sodium bicarbonate solution and once with brine. The combined organic layers were dried ($Na_2SO_4$) and evaporated to dryness under reduced pressure. The residual oil was triturated with ether-hexane giving crude 17β-acetoxy-4,6-dichloro - 17α - methyl-androsta - 4,6 - diene-3,11-dione which upon further crystallization from methylene chloride-ether formed colorless crystals of 17β-acetoxy-4,6-dichloro - 17α-methyl-androsta-4,6-diene-3,11-dione, M.P. 209–211°, $[\alpha]_D^{25}+341.5°$ (c. 0.523 in $CHCl_3$).

According to the above procedure, chlorination of:

(a) 17β-acetoxy-6-chloro-17α-methyl-androsta-4,6-dien-3-one yields 17β-acetoxy-4,6-dichloro-17α-methyl-androsta-4,6-diene-3-one.

(b) 17α-ethynyl-6-chloro-17β-hydroxy-19-nor-androsta-4,6-dien-3-one yields 17α-ethynyl-4,6-dichloro-17β-hydroxy-19-nor-androsta-4,6-dien-3-one.

(c) 17β-acetoxy-17α-methyl-6-chloro-19-nor-androsta-4,6-dien-3-one yields 17β-acetoxy-17α-methyl-4,6-dichloro-19-nor-androsta-4,6-dien-3-one.

Example 8

To a cooled (−10°) solution of 2.0 g. of 17α-acetoxy-6-methy-pregna-4,6-diene-3,20-dione in 21 ml. of dimethylformamide and 10.5 ml. of ether was added 5.0 ml. of a 1.15 M solution of chlorine in propionic acid. The reaction mixture was then allowed to stand at 0° for 6 hours and then at 20° for 14 hours. The resulting mixture was poured into 200 ml. of water and was extracted three times with ether-methylene chloride mixture (2.5:1). The organic layers were washed once with 5% sodium bicarbonate solution and once with brine. The combined organic layers were dried ($Na_2SO_4$) and evaporated under reduced pressure. The residue was crystallized twice from methylene chloride-ether giving 17α - acetoxy-4-chloro-6-methyl-pregna - 4,6-diene-3,20-dione which upon further purification by crystallization from methylene chloride-ether melted at 217.5–218.7°.

Example 9

A solution of 0.439 g. of 4,6-dichloro-17α-acetoxypregna-4,6-diene-3,20-dione, 0.03 g. of p-toluenesulfonic acid and 2.5 ml. of ethylene glycol in 15 ml. of dry benzene was distilled slowly over a 1.5 hour period. An additional 0.8 ml. of ethylene glycol, 8 ml. of benzene and 0.005 g. of p-toluenesulfonic acid was then added and slow distillation was carried out for an additional two hours. The cooled reaction mixture was then diluted with 20 ml. of ether and 40 ml. of 5% sodium bicarbonate solution. The two phases were separated and the organic layer was washed once with 5% sodium bicarbonate solution and once with water. The organic layer was dried over sodium sulfate, concentrated and the residue crystallized on the addition of ether. The resulting solid was crystallized twice from methylene chloride-ether mixture giving 3-cyclic ethylene acetal of 4,6-dichloro-17α-acetoxypregna-4,6-diene-3,20-dione, M.P. 266.5–268°, [α]$_D$+78.16° (c. 0.99 in CHCl$_3$).

Example 10

To a cooled (0°) solution of 0.698 g. of 6-fluoro-17,21-dihydroxypregna-4,6-diene-3,11,20-trione 21-acetate in 10 ml. of alcohol-free chloroform was added 2.93 ml. of a 0.813 molar solution of chlorine in dry carbon tetrachloride. The reaction mixture was allowed to stand at 0° for 18 hours. The solvent was then removed under reduced pressure and the residue was treated with 25 ml. of heptane. The solvent was again removed under reduced pressure and the solid residue was dissolved in 2 ml. of dry pyridine. After 24 hours at room temperature the pyridine solution was treated with 25 ml. of 1 N hydrochloric acid and the product was extracted with chloroform. The chloroform solution was then washed twice, each time with 10 ml. of 1 N hydrochloric acid and the combined aqueous layers were extracted with 50 ml. of ether. The organic layers were combined and dried over magnesium sulfate. The solvent was removed under reduced pressure and the residue was crystallized from methylene chloride-ethyl acetate yielding 4-chloro-6-fluoro - 17,21-dihydroxypregna-4,6-diene-3,11,20-trione 21-acetate, M.P. 245–247° (sinters 226°). Evaporation of the mother liquor and recrystallization of the residue yielded further product.

Example 11

To a stirred suspension of 1.0 g. of 4,6-dichloro-17α-hydroxypregna-4,6-diene-3,20-dione in 15 ml. of hexanoic acid was added 4.0 ml. of trifluoroacetic anhydride. The solid rapidly went into solution and stirring was continued at room temperature for 16 hours. The reaction mixture was then poured into 100 ml. of cold 5% sodium bicarbonate solution and the resulting mixture was extracted three times with ether-methylene chloride mixture (2.5:1). The organic layers were washed twice with 0.5 N sodium hydroxide solution, once with brine and were then combined, dried over sodium sulfate and evaporated.

The residue was dissolved in benzene-hexane (2:1) and was then chromatographed on 15 g. of synthetic magesia-silica gel (Florisil, available from The Floridin Company, Box 989, Tallahasse, Fla.). The product was eluted with benzene, 30% ethyl acetate-benzene and finally with ethyl acetate. The eluents were evaporated and the residues were crystallized by trituration with ether. The resulting solids were combined and crystallized from methylene chloride-ether giving crystals of 4,6-dichloro-17α-hydroxypregna - 4,6-diene-3,20-dione caproate, which upon one further crystallization from the same solvent system formed crystals, M.P. 118.5–120°, [α]$_D^{25}$+115.56° (c. 0.98 in CHCl$_3$).

Example 12

To a cooled (0°) solution of 0.60 g. of 17β-acetoxy-6-chloro-17α-methyl-androsta-4,6-diene-3,11-dione in 6 ml. of dry dimethylformamide and 3 ml. of ether was added 2.0 ml. of a 0.98 M solution of chlorine in propionic acid. The reaction mixture was allowed to stand at 0° for 3 hours. The reaction mixture was then diluted with 100 ml. of water and the resulting mixture extracted three times with ether-methylene chloride mixture (2.5:1). The organic layers were washed once with 5% sodium bicarbonate solution and once with brine. The combined organic layers were dried (Na$_2$SO$_4$) and evaporated to dryness under reduced pressure. The residual oil was dissolved in benzene and chromatographed on a 5 g. column of synthetic magnesia-silica gel (Florisil, available from The Floridin Company, Box 989, Tallahassee, Fla.). The benzene and ethyl acetate eluates were combined and evaporated to dryness. To a cooled (0°) solution of the residue in 6 ml. of dry dimethylformamide and 3 ml. of ether was added 2 ml. of a 0.05 M solution of chlorine in propionic acid. The reaction mixture was allowed to stand at 0° for 12 hours and was then diluted with 100 ml. of water. The mixture was extracted three times with ether-methylene chloride mixture (2.5:1) and the organic layers were washed once with 5% sodium bicarbonate solution and once with brine. The combined organic layers were dried (Na$_2$SO$_4$) and evaporated to dryness under reduced pressure. The residue crystallized on trituration with ether-hexane giving crude 17β-acetoxy-4,6-dichloro-17α-methyl-androsta - 4,6 - diene-3,11-dione which upon further crystallization from methylene chloride-ether formed colorless crystals, M.P. 209–211°, [α]$_D^{25}$+341.5° (c. 0.52 in CHCl$_3$).

Example 13

To a solution of 5.0 g. of 6-chloropregna-4,6-diene-3,20-dione in 30 ml. of dichloromethane and 250 ml. of ether cooled to −10° and protected from atmospheric moisture was added 15.8 ml. of a 1.1 M chlorine in propionic acid solution. The solutions were mixed thoroughly and allowed to stand at 0° overnight. Benzene (100 ml.) was added and the solution was concentrated under vacuum to about 200 ml. Pyridine (83 ml.) was then added and the resultant solution was heated at 40° for 5 hr. and poured into water. The organic layer and an ether extract of the aqueous layer were combined and washed with water, 2 N hydrochloric acid, water, 5% sodium bicarbonate and finally with water, dried over sodium sulfate and evaporated. The residue was dissolved in 20% benzene in hexane and adsorbed onto 125 g. of silica gel. Early benzene fractions eluted some less polar material and later benzene fractions eluted crystalline product. These crystalline fractions were combined and crystallized from ethanol and hexane giving 4,6-dichloro-pregna-4,6-diene-3,20-dione as colorless crystals which upon one further recrystallization gave crystals, M.P. 127–130°, $$\lambda_{max.}^{C_2H_5OH} \ 299 \ m\mu \ (\epsilon \ 18,000)$$

Example 14

A solution of 1.00 g. of 4,6-dichloro-pregna-4,6-diene-3,20-dione in 10 ml. of carbon tetrachloride protected from atmospheric moisture is cooled to 10° and a mixture of 0.1 ml. of 70% perchloric acid and 2 ml. of acetic anhydride is added over 10 minutes. After stirring for an additional hour at 10°, the solution is diluted with 100 ml. of ether and washed with 5% sodium bicarbonate and then with water. The solution is dried over sodium sulfate and concentrated to an oil containing 20-acetoxy-4,6-dichloropregna-4,6,17(20)-triene-3-one sufficiently pure for subsequent reactions.

Example 15

To a stirred solution of 20-acetoxy-4,6-dichloropregna-4,6,17(20)-triene-3-one (prepared from 0.50 g. of 4,6-dichloropregna-4,6-diene-3,20-dione according to the procedure of Example 14) in 2.5 ml. of benzene is added 0.5 ml. of 40% peracetic acid. After 4 days, 5 ml. of 10% sodium sulfite is added and the mixture is stirred vigorously. The reaction mixture is diluted with ether, washed with water, dried (Na$_2$SO$_4$) and evaporated. The residue is adsorbed onto silica gel from benzene solution and eluted with 5% ether in benzene. Crystallization from ether gives 17α-hydroxy - 4,6 - dichloropregna-4,6-diene-3,20-dione.

Example 16

A solution of 20 - acetoxy - 4,6 - dichloropregna-4,6,17(20)-triene-3-one (prepared from 0.50 g. of 4,6-dichloropregna-4,6-diene-3,20-dione according to the procedure of Example 14) in 8.0 ml. of benzene is added with stirring over 5 minutes to a mixture of 2.0 ml. of 40% peracetic acid and 80 mg. of sodium acetate. After the reaction mixture has been stirred at room temperature for 13 hours, 10 ml. of ice water followed by 20 ml. of 10% sodium sulfite is added. The organic layer is then diluted with ether, washed with water, dried (Na$_2$SO$_4$) and evaporated to an oil containing 20-acetoxy-17α,20-oxido-4,6-dichloropregna-4,6-diene-3-one sufficiently pure for subsequent reactions.

Example 17

A solution of 20 - acetoxy-17α,20-oxido-4,6-dichloropregna-4,6-diene-3-one (prepared from 0.25 g. of 20-acetoxy-4,6-dichloropregna-4,6,17(20) - triene-3-one according to the procedure of Example 16) in 15 ml. of tetrahydrofuran and 5 ml. of 1 N hydrochloric acid is stirred at room temperature for 6 hours and poured into ice water. The amorphous precipitate is collected by filtration and adsorbed onto synthetic magnesia-silica gel (Florisil, available from The Floridin Company, Box 989, Tallahassee, Fla.) from benzene solution. The later benzene eluates upon evaporation and crystallization from ether give 17α-hydroxy - 4,6 - dichloropregna-4,6-diene-3,20-dione.

Example 18

A mixture of 20 - acetoxy-17α,20-oxido-4,6-dichloropregna-4,6-diene-3-one (prepared from 0.25 g. of 20-acetoxy - 4,6 - dichloropregna-4,6,17(20)-triene-3-one according to the procedure of Example 16), 20 ml. of methanol and 300 mg. of sodium carbonate monohydrate is stirred at room temperature for 2 hours. Ice water (25 ml.) is added and after stirring for an additional 30 minutes the resultant solid is collected. Recrystallization from ether gives 17α-hydroxy - 4,6 - dichloropregna-4,6-diene-3,20-dione.

Example 19

An ointment of the following formulation is prepared as described below:

| | Per kilo g. |
|---|---|
| White petrolatum, U.S.P. | 999 |
| 4,6 - dichloro - 17α - acetoxypregna-4,6-diene-3,20-dione | 1 |

The white petrolatum U.S.P. was placed in a suitable jacketed mixing kettle and heated to approximately 85° with constant slow agitation. The drug, 4,6-dichloro-17α-acetoxy-pregna-4,6-diene-3,20-dione, which was first ground to a fine powder in a small ball mill, was then added slowly to the melted petrolatum and the mixture stirred until thoroughly mixed. Cool water was then circulated through the jacketed kettle and the cooling continued until the temperature reached about 36°. The mixture was then passed into an Eppenbach colloid mill at a setting of 20 microns. The so-obtained preparation was then packaged in opal glass jars. If desired, aluminum or tin ointment tubes can be substituted for the glass jar.

Example 20

Capsules containing the following formulation are prepared as described below:

| | Per capsule mg. |
|---|---|
| 4,6 - dichloro - 17α - acetoxypregna - 4,6 - diene-3,20-dione | 0.5 |
| Lactose | 180.0 |
| Corn starch | 39.5 |
| Talc | 5.0 |
| Total weight | 225.0 |

The 4,6 - dichloro - 17α-acetoxypregna-4,6-diene-3,20-dione was mixed with the lactose and corn starch in a suitable mixer. The mixture was further blended by passing through a suitable comminuting machine, e.g., a Fitzpatrick Comminuting Machine with a No. 1A screen with knives forward. The blended powder was then returned to the mixer, the talc added and the resultant mixture blended thoroughly. It was then filled into No. 4 hard shell gelatin capsules on a casulating machine.

Example 21

Tablets of the following formulation are prepared as described below:

| | Per tablet mg. |
|---|---|
| 4,6 - dichloro - 17α - acetoxypregna - 4,6 - diene-3,20-dione | 1.0 |
| Lactose, spray dried | 95.0 |
| Corn starch, U.S.P. | 3.0 |
| Calcium stearate | 1.0 |
| Total weight | 100.0 |

The 4,6-dichloro-17α-acetoxypregna - 4,6-diene-3,20-dione, lactose, corn starch and calcium stearate were blended in a suitable mixer. The powder was then compressed on a heavy duty tablet compressing machine and yielded tablet slugs of about 1" diameter and ¼" thickness. The tablet slugs were passed through a suitable comminuting machine and yielded granules of approximately 16 mesh with a minimum of fines. The granulation was recompressed on a tablet compressing machine using a ¼" standard concave punch to an average tablet weight of 100 mg.

Example 22

A 12½% premix for animal feed of the following composition is prepared as described below:

| | Grams/kilo gms. |
|---|---|
| 4,6 - dichloro - 17α - acetoxypregna - 4,6 - diene-3,20-dione | 125 |
| Corn germ meal | 831 |
| Drew oil 1400 [1] | 44 |
| Total weight | 1000 |

[1] Drew Oil 1400 is a mixture of glyceryl triesters of lower molecular ($C_6$–$C_{12}$) weight fatty acids (available as Drew Oil 1400, E. F. Drew & Co., Inc., New York, N.Y. Also, this type of oil is described in Barsky et al., U.S.P. 2,988,484).

The corn germ meal was placed in a suitable mixer and while mixing, the Drew Oil 1400 was slowly added and thoroughly mixed. While mixing continuously the 4,6-dichloro-17α-acetoxypregna-4,6 - diene - 3,20 - dione was slowly added and mixed until the mixture was homogenous. This premix was then added to a commercial poultry feed at the ratio of 2 lbs./ton to yield a ratio of 0.0125% drug, and thoroughly mixed. This medicated feed was used in the mash form, and it was also pelleted on a pellet mill, the Sprout-Waldron Pellet Mill.

Amounts of the above premix can be added to the commercial feed to yield medicated levels ranging from 0.005% to 0.05%. The commercial feeds to which this premix is added can be free of other medicaments or can contain other medicaments.

Example 23

A 6% premix for animal feed of the following composition is prepared as described below:

| | Grams/kilo gms. |
|---|---|
| 4,6 - dichloro - 17α - acetoxypregna - 4,6 - diene-3,20-dione | 60 |
| Corn germ meal | 896 |
| Drew Oil 1400 [1] | 44 |
| Total weight | 1000 |

[1] Drew Oil 1400 is a mixture of glyceryl triesters of lower molecular ($C_6$–$C_{12}$) weight fatty acids (available as Drew Oil 1400, E. F. Drew & Co., Inc., New York, N.Y. Also, this type of oil is described in Barsky et al., U.S.P. 2,988,484).

The corn germ meal was placed in a suitable mixer and while mixing, the Drew Oil 1400 was slowly added and thoroughly mixed. While mixing continuously the 4,6-dichloro-17α-acetoxypregna - 4,6 - diene - 3,20 - dione was slowly added and mixed until the mixture was homogenous. This premix was then added to a commercial poultry feed at the ratio of 2 lbs./ton to yield a ratio of .006% drug, and thoroughly mixed. This medicated feed was used in the mash form, and it was also pelleted on a pellet mill, the Sprout-Waldron Pellet Mill.

Amounts of the above premix can be added to the commercial feed to yield medicated levels ranging from 0.0005% to 0.05%. The commercial feeds to which this premix is added can be free of other medicaments or can contain other medicaments.

Example 24

A cream of the following formulation is prepared as described below:

| | Percent |
|---|---|
| 4,6 - dichloro - 17α - acetoxypregna - 4,6 - diene-3,20-dione | 0.1 |
| Stearic acid | 13.50 |
| Light mineral oil | 1.35 |
| Sorbitan monostearate | 2.25 |
| Methyl p-hydroxybenzoate | 0.08 |
| Propyl p-hydroxybenzoate | 0.02 |
| Sorbitol | 4.50 |
| Polysorbate 60 (i.e., polyoxyethylene 20 sorbitan monostearate) | 1.60 |

Distilled water q.s. ad 100.00.
pH (approx.) 5.1.

The stearic acid, light mineral oil, sorbitan monostearate, methyl p-hydroxybenzoate and propyl p-hydroxybenzoate were placed in a suitable jacketed kettle, and the mixture melted and heated to 70°. The 4,6-dichloro-17α-acetoxypregna-4,6-diene-3,20-dione was then added with agitation. To a separate suitable, jacketed kettle were added the water, sorbitol, and polysorbate 60, and this mixture was then heated to 70°. The water phase was added to the oil phase with agitation, the whole mixture agitated for 15 minutes at 70°, cooled to 50°, brought to final volume with distilled water and cooled to room temperature with good agitation.

Example 25

A liquid concentrate of the following formulation is prepared as described below:

| | Per kilo g. |
|---|---|
| 4,6 - dichloro - 17α - acetoxypregna - 4,6-diene 3,20-dione | 25 |
| Polysorbate 80, U.S.P. (i.e., polyoxyethylene 20 sorbitan monooleate) | 400 |
| Propylene glycol | 575 |

The polysorbate and propylene glycol were well mixed in a suitable size glass container, and the drug, 4,6-dichloro-17α-acetoxypregna-4,6-diene-3,20-dione, was slowly added with constant stirring. This 2.5% concentrate of the drug was packaged in a glass container for shipment and storage. In use the 2.5% concentrate is diluted by addition to a molasses based liquid protein supplement to give a concentration of from one to ten mg. of drug per pound of liquid protein supplement. This is then added to the final grain carrier in amounts sufficient to give the desired dosage of drug per day per animal.

Example 26

To a stirred solution of 10.0 g. of 3-ethoxy-17β-acetoxy-17α-methyl-androsta-3,5-diene in 500 ml. of acetone was added a solution of 6.0 g. of sodium acetate in 60 ml. of water. The resulting mixture was cooled to 5° and 4.3 g. of N-chlorosuccinimide was added over a 5 minute period, followed by the rapid addition of 33.6 ml. of glacial acetic acid. The reaction mixture was then allowed to stir at 5° for 75 minutes and was then diluted with 750 ml. of water. The mixture was extracted 3 times each time with ether-methylene chloride mixture (2.5:1). The organic layers were washed once with 5% sodium bicarbonate solution and once with water. The combined organic layers were dried over sodium sulfate and evaporated. The residue was dissolved in benzene and chromatographed on a 300 g. column of synthetic magnesia-silica gel (Florisil, available from The Floridin Company, Box 989, Tallahassee, Fla.). The benzene and ethyl acetate eluents were combined and evaporated. The residue was crystallized from acetone-hexane giving 6β-chloro-17β-acetoxy-17α-methylandrost-4-en3-one, M.P. 155–158°, which is sufficiently pure for the next step.

Example 27

To a stirred solution of 4.5 g. of 6β-chloro-17β-acetoxy-17α-methylandrost-4-en-3-one in 25 ml. of dry dioxane was added 5.0 ml. of trimethyl-orthoformate and 0.20 g. of p-toluenesulfonic acid. The reaction mixture was stirred at room temperature for 80 minutes and was then diluted with a solution comprising 50 ml. of water and 2 ml. of pyridine. The mixture was then stirred at room temperature for 50 minutes and the resulting precipitate was then filtered, washed with water and crystallized from acetone (about 20 ml., containing 1 ml. of pyridine) giving 6-chloro - 3 - methoxy-17β-acetoxy-17α-methylandrosta-3,5-diene, M.P. 133–135.5°.

Example 28

To a stirred solution of 81 g. of 6-chloro-3-methoxy-17β-acetoxy-17α-methylandrosta-3,5-diene in 2.4 liters of carbon tetrachloride was added 810 ml. of a solution of t-butyl chromate, prepared by the method of K. Heusler and A. Wettstein, Helv. Chim, Acta, 35, 289 (1952), in carbon tetrachloride, followed by 81 ml. of acetic anhydride. The resulting mixture was heated under reflux for 12 hours. A solution of 243 g. of oxalic acid in 2 liters of water was then added to the cooled solution, and an exothermic reaction occurred while the mixture was stirred for 2 hours. The cooled reaction mixture was then extracted with 3 liters of chloroform and the organic layer was separated and washed once with water, once with 5% sodium carbonate solution (1 liter) and once with brine. The organic layer was dried over sodium sulfate and evaporated. The residue was dissolved in benzene and chromatographed on 1 kg. of synthetic magnesiasilica gel (Florisil, available from The Floridin Company, Box 989, Tallahassee, Fla.). The product was eluted with 4.5 liters of 10% ethyl acetate-benzene, and 1.5 liters of 20% ethyl acetate-benzene. The combined fractions were evaporated and the residue was crystallized from ethyl acetate giving 6 - chloro-17β-acetoxy-17-methylandrosta-4,6-dien-3-one, which upon crystallization from ethyl acetate melted at 161–162.5°, $[\alpha]_D^{25}$+25.80. (C. 0.53 in $CHCL_3$).

Example 29

To a cooled (0°) solution of 1.5 g. of 6-chloro-17β-acetoxy-17α-methylandrosta-4,6-dien-3-one in 15 ml. of dry dimethylformamide and 10 ml. of ether was added 3.2 ml. of 1.4 M solution of chlorine in propionic acid. The mixture was allowed to stand at 0° for 24 hours and then at 25° for 12 hours.

The reaction mixture was then poured into 100 ml. of cold water and the resulting mixture was extracted three times with ether-methylene chloride mixture (2.5:1). The organic layers were washed once with 5% sodium bicarbonate solution and once with brine. The combined organic layers were dried over sodium sulfate and evaporated under reduced pressure. The residue was dissolved in benzene and chromatographed on 15 g. of synthetic magnesia-silica gel (Florisil, available from The Floridin Company, Box 989, Tallahassee, Fla.). The benzene and ethyl acetate eluates were evaporated and the residue was crystallized once from methylene chloride-ether and three times from methanol giving 4,6-dichloro-17β-acetoxy-17α-methylandrosta-4,6-dien-3-one, M.P. 141–146°, $[\alpha]_D^{25}$+ 158.9° (c. 0.53 in $CHCl_3$).

Example 30

To a stirred (0°) solution of 20.0 g. of lithium aluminum hydride in 1 liter of ether was rapidly added a solution of 25.0 g. of 6-chloro-17β-acetoxy-17-methylandrosta-4,6-dien-3-one in 2 liters of ether. The reaction mixture was stirred at 0° for 10 minutes and was then allowed to warm to room temperature over a 1 hour period. The mixture was then again cooled to 0° after which 100 ml. of ethyl acetate was added over a 10 minute period, followed by the addition of 250 ml. of saturated sodium sulfate solution. The reaction mixture was warmed to room temperature and filtered through a bed of filter aid. The precipitate was washed with ether and methylene chloride. The filtrate was washed with water, dried over sodium sulfate and evaporated to give a colorless solid which was dissolved in 250 ml. of dry dioxane. To the so-formed solution, with stirring, was added a suspension of 20 g. of 2,3-dichloro-5,6-dicyanobenzoquinone in 210 ml. of dry dioxane and the resulting mixture was stirred at room temperature for 16 hours. The resultant precipitate was then filtered, washed with dioxane, and the filtrate was evaporated to dryness. The residue was dissolved in 1 liter of ethermethylene chloride mixture (2.5:1) and was washed 3 times with 1% sodium hydroxide solution (3 liters). The organic layers were combined, dried over sodium sulfate and evaporated. The residue was dissolved in benzene and chromatographed on 200 g. of synthetic magnesia-silica gel (Florisil, available from The Floridin Company, Box 989, Tallahassee, Fla.). The column was eluted with benzene, 500 ml. of 20% ethyl acetate-benzene and 250 ml. of 50% ethyl acetate-benzene. The eluents were combined and evaporated. The residue was crystallized from methylene chloride-ethanol giving 6-chloro-17β-hydroxy-17-methylandrosta-4,6-dien-3-one. Additional 6-chloro-17β-hydroxy-17α-methylandrosta-4,6-dien-3-one was recovered from the mother liquors. Upon recrystallization from ethanol 6-chloro-17β-hydroxy-17-methylandrosta-4,6-dien-3-one melted at 166–167.5°.

Example 31

To a cooled (−2°) solution of 1.57 g. of 6-chloro-17β-hydroxy-17α-methylandrosta-4,6-dien-3-one in 15 ml. of dry dimethylformamide and 10 ml. of ether was added 6.0 ml. of 0.90 M solution of chlorine in propionic acid. The mixture was allowed to stand at 0° for 12 hours and at 25° for 5 hours.

The reaction mixture was then poured into 100 ml. of water and was extracted three times with ether-methylene chloride mixture (2.5:1). The organic layers were washed twice with 5% sodium bicarbonate solution and once with brine. The organic layers were then combined, dried over sodium sulfate and evaporated. The residue was crystallized three times from methylene chloride-ether giving 4,6-dichloro-17β-hydroxy-17-methylandrosta-4,6-dien-3-one which upon further crystallization from the same solvent system melted at 156–157.5°, $[\alpha]_D^{25}$ +167.6° (c. 0.53 in $CHCl_3$). This compound occasionally crystallized as a polymorphic mixture, M.P. 157–181°.

Example 32

To a stirred solution of 4.5 g. of 4,6-dichloro-17β-hydroxy-17α-methylandrosta-4,6-dien-3-one in 110 ml. of dry t-amyl alcohol was added 10.5 g. of selenious acid and 4.5 ml. of acetic anhydride and the resulting mixture was heated under reflux. An additional 4.0 g. of selenious acid was added over a 48 hour period. After heating under reflux for a total of 60 hours, the reaction mixture was cooled, diluted with chloroform and filtered. The filtrate was washed once with 5% sodium bicarbonate solution, once with 1 N hydrochloric acid solution and once with water. The organic layer was dried over sodium sulfate and evaporated. The residue in benzene was chromatographed on a 50 g. column of synthetic magnesia-silica gel (Florisil, available from The Floridin Company, Box 989, Tallahassee, Fla.). The column was eluted with benzene and 30% ethyl acetate-benzene. The combined eluents were then evaporated and the residue was crystallized from methylene chloride-ether giving 4,6-dichloro-17β-hydroxy-17-methylandrosta-1,4,6-trien-3-one which upon further crystallization from the same solvent system melted at 225–226.5°, $[\alpha]_D^{25}$ +6.4° (c. 1.06 in $CHCl_3$).

Example 33

To a cooled (−8°) solution of 87.0 g. of 6-chloro-17α-hydroxypregna-4,6-diene-3,20-dione in a mixture of 870 ml. of dimethylformamide (dried over calcium hydride) and 435 ml. of ether was added 356 ml. of a 0.95 M solution of chlorine in propionic acid. The mixture was allowed to stand at 0° for 14 hours and then at 25° for 6 hours.

The reaction mixture was then poured into 3 liters of water and was extracted three times with ether-methylene chloride mixture (2.5:1). The organic layers were washed twice with 1.5 liters of 5% sodium bicarbonate solution and once with 2 liters of brine. The combined organic layers were dried over sodium sulfate and evaporated under reduced pressure. The residual oil was dissolved in benzene-hexane (2:1) and chromatographed on 1100 g. of synthetic magnesia-silica gel (Florisil, available from The Floridin Company, Box 989, Tallahassee, Fla.). The column was eluted with 2 liters of benzene-hexane (0 mg. residue), 1 liter benzene (18 mg.), 1 liter 2% ethyl acetate-benzene (32 mg.), 1 liter 5% ethyl acetate-benzene (5.92 g.—noncrystalline) and 500 ml. 10% ethyl acetate-benzene (19.0 g.—noncrystalline). Further elution with 500 ml. of 10% ethylacetate-benzene (19.3 g.), 1.5 liters of 20% ethyl acetate-benzene (54.1 g.) and 1 liter of 40% ethyl acetate-benzene (16.0 g.) gave fractions which crystallized readily on trituration with ether.

The combined solids were crystallized twice from methylene chloride-ether giving 4,6-dichloro-17α-hydroxypregna-4,6-diene-3,20-dione which upon crystallization from the same solvent system melted at 159.5–161°, $[\alpha]_D^{25}$ +185.4° (c. 0.5 in $CHCl_3$).

Example 34

To a suspension of 27.0 g. of 4,6-dichloro-17α-hydroxypregna-4,6-diene-3,20-dione in 1350 ml. of glacial acetic acid and 270 ml. of acetic anhydride was added 27.0 g. of p-toluenesulfonic acid. The reaction mixture was stirred until all solid went into solution and was then allowed to stand at room temperature for a total of 6 hours.

The mixture was poured into 7 liters of water and after 30 minutes the precipitate was filtered and washed well with water. The resulting wet product was dissolved in about 1 liter of methylene chloride, dried over sodium sulfate and evaporated under reduced pressure to about 200 ml. This solution was transferred to an Erlenmeyer flask and the hot solution was concentrated with the simultaneous addition of ethyl acetate (about 150 ml.). The product precipitated out of the boiling solution (about 150 ml. final volume) giving 4,6-dichloro-17α-acetoxypregna-4,6-diene-3,20-dione which upon one further crystallization from the same solvent system melted at 241.5–243°. (Additional 4,6-dichloro-17α-acetoxypregna-4,6-diene-3,20-dione was obtained from the mother liquors).

Example 35

To a solution of 41.4 g. of 3β,17α-diacetoxy-16β-methylpregn-5-ene-20-one in 1130 ml. of dry benzene and 31 ml. of pyridine was added 0.10 mole of a chlorine in carbon tetrachloride solution (freshly prepared and standardized). After the reaction was stirred at room temperature for 1 hour 45 minutes, thin layer chromatography showed the absence of starting material. The reaction was diluted with 500 ml. of dichloromethane and washed three times with 1 N hydrochloric acid and once with water. The organic layer was dried with sodium sulfate and concentrated to a colorless crystalline residue which on recrystallization from dichloromethane-ether gave 3β,17α-diacetoxy-5α,6β-dichloro - 16β - methylpregnane-20-one as colorless crystals which upon further recrystallization melted at 219–223°.

Example 36

A mixture of 30.0 g. of 3β,17α-diacetoxy-5α,6β-dichloro-16β-methylpregnane-20-one, 25.4 g. of potassium bicarbonate, 500 ml. of methanol, 600 ml. of acetone and 132 ml. of water was refluxed for 4 hours. The reaction mixture was diluted with 1 liter of water, cooled to room temperature and filtered giving 5α,6β-dichloro-3β,17α-dihydroxy-16β-methylpregnan-20-one 17-acetate as colorless crystals which upon recrystallization from dichloromethane-ether melted at 220–223.5°.

Example 37

A solution of 21.0 g. of 5α,6β-dichloro-3β,17α-dihydroxy-16β-methylpregnan-20-one 17-acetate in 840 ml. of acetone was cooled to 5° and treated with 8 N chromic acid solution until a permanent brown color remained (about 25 ml.). The reaction mixture was then poured into 7 liters of water, stirred for one hour, and the precipitate was collected by filtration and washed with water. The damp filter cake was mixed with 19 g. of sodium acetate and 420 ml. of methanol and heated under reflux for 2 hours. The cooled mixture was poured into 4 liters of water and stirred at room temperature. The resulting semisolid precipitate was separated and dissolved in dichloromethane. This solution was dried with sodium sulfate and evaporated to give 20 g. of 17α-acetoxy-6β-chloro-16β-methyl-pregn-4-ene-3,20-dione as a viscous oil. An 18 g. portion of this material was mixed with 75 ml. of tetrahydrofuran, 28.4 ml. of triethyl orthoformate and 9.75 ml. of absolute ethanol. The resulting solution was covered to protect it from light and after the addition of 175 mg. of p-toluenesulfonic acid was stirred for 90 minutes. The solution was then diluted with 3.6 ml. of pyridine, followed by 700 ml. of water. The resulting precipitate was collected by filtration, washed with water and dissolved in dichloromethane. This solution was dried with sodium sulfate, and concentrated to crude 6-chloro-3-ethoxy-17α-acetoxy-16β-methylpregna-3,5-diene-20-one as a semisolid residue (19 g.) which would be used for subsequent reactions. Recrystallization of a portion of this material from dichloromethane/ether gave 6-chloro-3-ethoxy-17α-acetoxy-16β-methylpregna-3,5-diene-20-one as colorless crystals, M.P. 202.5–204.5°.

Example 38

A solution of 10.1 g. of dichlorodicyanobenzoquinone in 44.2 ml. of acetone and 2.4 ml. of water was added to a solution of 2.00 g. of crude 6-chloro-3-ethoxy-17α-acetoxy-16β-methylpregna-3,5-diene-20-one in 176 ml. of acetone and 8.9 ml. of water. The reaction mixture was stirred for 20 minutes and then concentrated at room temperature. The residue was diluted with 1 liter of 1:1 hexane:dichloromethane, washed 3 times with 1 N sodium hydroxide, then with water, dried with sodium sulfate and evaporated to an oil. This was crystallized twice from dichloromethane-ether giving 6-chloro - 17α - acetoxy - 16β-methylpregna4,6-diene-3,20-dione as colorless crystals which upon further recrystallization from dichloromethane-methanol melted at 257–259°.

Example 39

To a solution of 560 mg. of 6-chloro-17α-acetoxy-16β-methylpregna-4,6-diene-3,20-dione in 7 ml. of ether and 3 ml. of dichloromethane cooled to —30° was added 1.29 mmoles of a chlorine in propionic acid solution (freshly prepared and standardized). The solution was allowed to stand at —15° for 2 hours and then poured into water containing excess sodium bisulfite. The aqueous solution was extracted with dichloromethane and this extract was washed with water, dried and concentrated to an oil. This was mixed with 5 ml. of pyridine, and after standing at room temperature for 2 hours the solution was poured into water and extracted with a mixture of dichloromethane and ether (2:5). The organic layer was washed with 0.5 N hydrochloric acid, 5% sodium bicarbonate and water, dried and evaporated to an oil. This was crystallized from dichloromethane - ether giving 4,6-dichloro-17α-acetoxy-16β-methylpregna-4,6-diene-3,20-dione as colorless crystals which upon further recrystallization from dichloromethane-methanol melted at 243–247°.

Example 40

To a solution of 200 mg. of 6-chloro-17β-hydroxy-19-nor-17α-pregna-4,6-diene-20-yn-3-one in 3 ml. of ether and 0.5 ml. of dichloromethane cooled to —30° was added 0.67 mmole of a chlorine in propionic acid solution (freshly prepared and standardized). The solution was allowed to stand at —15° for 15 minutes and then poured into water containing excess sodium bisulfite. The aqueous solution was extracted with dichloromethane and this extract was washed with water, dried and concentrated to an oil. This was dissolved in 2 ml. of pyridine and after standing at room temperature for 3 days the solution was poured into water and extracted with a mixture of dichloromethane and ether. The organic layer was washed with 0.5 N hydrochloric acid, water, 5% sodium bicarbonate, dried, and evaporated to an oil. This was crystallized from dichloromethane-ether giving 4,6-dichloro-17β-hydroxy-19-nor-17α-pregna-4,6-diene-20-yn-3-one, as colorless crystals which upon further recrystallization melted at 217° dec.

Example 41

A solution of 2.000 g. of 17α-acetoxy-4,6-dichloropregna-4,6-diene-3,20-dione in 20 ml. of anhydrous tetrahydrofuran was added dropwise over a 15-minute period to 3.280 g. of lithium aluminum tri-t-butoxyhydride in 20 ml. of anhydrous tetrahydrofuran under a nitrogen atmosphere. After stirring at room temperature for 2 hours, 20 ml. of acetone was added followed by 150 ml. of 10% acetic acid in water. The mixture was extracted with two 75 ml. portions of chloroform, the organic layers were combined, washed with 5% sodium bicarbonate, dried with magnesium sulfate and concentrated under reduced pressure. The crude solid was crystallized from acetone-hexane which upon recrystallization from the same solvent system yielded 17α-acetoxy-4,6-dichloropregna-4,6-dien-3β-ol-20-one melting at 255–257°.

Example 42

A mixture of 1.000 g. of 17α-acetoxy-4,6-dichloro-3β-hydroxypregna-4,6-diene-20-one, 10 ml. of acetic anhydride and 10 ml. of pyridine was left at room temperature for 18 hours. The excess reagents were removed under vacuum and the residue was diluted with xylene and again concentrated to dryness. Crystallization from methanol gave 3β,17α-diacetoxy-4,6-dichloropregna-4,6-diene-20-one which upon recrystallization from methanol melted at 218–220°.

Example 43

To 7.48 g. of 6β-chloro-17α,21-dihydroxy-16α-methylpregn-4-ene-3,20-dione 21-acetate in 165 ml. absolute ethanol and 165 ml. absolute dioxane was added 8.25 ml. triethyl orthoformate and 0.578 g. p-toluenesulfonic acid monohydrate. The reaction mixture was stirred at room temperature under a nitrogen atmosphere in the dark for 1 hour, 5.5 ml. of pyridine was added and the solvents were removed at reduced pressure to yield an oil. The oil was dissolved in 290 ml. acetic acid and 25 ml. water and 26.4 g. of activated manganese dioxide was added in one portion. After stirring for 3 hours under a nitrogen atmosphere, the manganese dioxide was removed by filtration through a filter aid and the cake washed well with chloroform. The filtrate was concentrated under vacuum to a viscous oil which was taken up in chloroform, washed with 5% sodium bicarbonate, 1 N hydrochloric acid and water. Concentration of the dried (MgSO₄) extract gave a dark residue which was triturated with ether to yield a yellow solid. Chromatography on 80 g. of silica gel and elution with 5% ethyl acetate in benzene gave white solid which was crystallized from ethyl acetate-hexane yielding 6-chloro-17α,21-dihydroxy-16α-methylpregna - 4,6-diene-3,20-dione 21-acetate, M.P. 224–227°.

Example 44

To 4.178 g. of 6-chloro-17α,21-dihydroxy-16α-methylpregna-4,6-diene-3,20-dione 21-acetate in 40 ml. of chloroform (filtered through silica gel to remove alcohol) at 0° was added rapidly 11.0 ml. (0.011 mole; 1.0 molar) of a solution of chlorine in carbon tetrachloride. After 1 hour at 3°, the solvents were removed at reduced pressure and the resultant foam was treated with 25 ml. of pyridine. After standing at room temperature for 1 hour 45 minutes, the pyridine was removed on the oil pump and the residue taken up in methylene chloride, washed with 2 N hydrochloric acid, water, dried with magnesium sulfate and concentrated at reduced pressure. Trituration of the residue with hexane and concentration to dryness gave a yellow solid. Chromatography on 125 g. of silica gel and elution with 2.5% ethyl acetate in benzene gave, on ether trituration of the combined fractions, 2α,4,6-trichloro-17α,21-dihydroxy-16α-methylpregna-4,6-diene-3,20-dione 21-acetate which upon crystallization from methylene chloride-ether melted at 199.5–201°.

Elution with 10% ethyl acetate in benzene gave 4,6-dichloro-17α,21-dihydroxy-16α-methylpregna - 4,6-diene-3,20-dione 21-acetate which upon crystallization from methylene chloride-ether melted at 189.5–190°.

Example 45

To 18.25 g. of 6β-chloro-17α,21-dihydroxy-16β-methylpregn-4-en-3,20-dione 21-acetate in 390 ml. absolute ethanol and 390 ml. anhydrous dioxane was added 20.8 ml. triethyl orthoformate and 1.30 g. p-toluenesulfonic acid monohydrate. The reaction mixture was stirred at room temperature under nitrogen in the dark for 2½ hours. The reaction mixture was then cooled in an ice bath, 13 ml. of pyridine was added and the mixture was concentrated to ca. 200 ml. under reduced pressure. Water (1 liter) was added with stirring and the resultant solid was filtered and washed well with water to yield 21-acetoxy-6-chloro-3-ethoxy-17α-hydroxy - 16β - methylpregna-3,5-dien-20-one which upon crystallization from aqueous methanol containing 0.5 ml. of pyridine yielded 12.29 g. melting at 147–148°. This enol ether (12.29 g.) was added in one portion to a suspension of 60.5 g. of activated manganese dioxide in 650 ml. of acetic acid and 55 ml. of water. After stirring under a nitrogen atmosphere at room temperature for 3 hours, the manganese dioxide was removed by filtration through a filter aid. The filtrate was concentrated to dryness under vacuum to an oil which was taken up in chloroform, washed with 5% sodium bicarbonate, 1 N hydrochloric acid and with water. Concentration of the dried (MgSO₄) extract gave a yellow solid (8.26 g.). Two crystallizations of the crude product from ethyl acetate-hexane yielded 6-chloro-17α,21-dihydroxy - 16β-methylpregna-4,6-diene-3,20-dione 21-acetate melting at 201.5–203°.

Example 46

To 4.346 g. of 6-chloro-17α,21-dihydroxy-16β-methylpregna-4,6-diene-3,20-dione 21-acetate in 40 ml. of chloroform (filtered through silica gel to remove alcohol) at 0° was added rapidly 11.0 ml. (0.011 mole; 1.0 molar) of a solution of chlorine in carbon tetrachloride. After 2 hours at 3°, solvents were removed under reduced pressure and the resultant foam was treated with 25 ml. of pyridine. After the reaction mixture stood at room temperature for 2 hours, the pyridine was removed under vacuum and the residue was taken up in methylene chloride, washed with 2 N hydrochloric acid, water, dried (MgSO₄) and concentrated under reduced pressure to yield 4,6-dichloro-17α,21-dihydroxy-16β-methylpregna-4,6-diene-3,20-dione 21-acetate as a crude solid which upon two crystallizations from methylene chloride-ether melted at 196–197.5°.

Example 47

To a solution of 3.9 g. of 6-chloro-17α-acetoxy-16-methylenepregna-4,6-dien-3,20-dione in 25 ml. of alcohol-free chloroform was added dropwise (at 0°) 11.3 ml. (5 % excess) of a 0.87 molar solution of chlorine in carbon tetrachloride. The resultant solution was stirred for one hour at 0° and the solvents were then removed under reduced pressure. The resulting foam was treated with 10 ml. of dry pyridine and then stirred at room temperature for 2 hours. Ether (200 ml.) was added and the mixture was twice extracted, each time with 150 ml. of 1 N hydrochloric acid. The ether solution was then dried and the solvent was removed under reduced pressure. The residue was triturated with ether to give 2.4 g. of material which was chromatographed on 100 g. of silica gel. Elution with 2% ethyl acetate-benzene gave 2α,4,6-trichloro-17α - acetoxy-16-methylenepregna-4,6-dien-3,20-dione which upon crystallization from methylene chloride-ether melted at 235–238° d. (dec. begins 225°).

Further elution with 5% ethyl acetate-benzene gave 4,6-dichloro-17α-acetoxy-16-methylenepregna - 4,6-dien-3,20-dione which upon crystallization from methylene chloride-ether melted at 218–219°.

Example 48

A solution of 0.250 g. of 2α,4,6-trichloro-17α-acetoxy-16-methylenepregna-4,6-dien-3,20-dione, 0.1 g. of lithium chloride, and 3 ml. of dry dimethylformamide was refluxed for one half hour under a nitrogen atmosphere. The solution was then cooled and poured into 100 ml. of ice water. The product was filtered and air-dried. The so-obtained crude material was chromatographed on 6 g. of neutral alumina (grade I). Elution with a 1:1 solution of petroleum ether (60–90°) and methylene chloride and finally methylene chloride gave 4,6-dichloro-17α-acetoxy-16-methylenepregna-1,4,6-triene-3,20-dione as a light yellow product which upon crystallization from ether-methylene chloride melted at 225–228°.

Example 49

To a solution of 0.5 g. of 4,6-dichloro-17α-acetoxy-16-methylenepregna-4,6-dien-3,20-dione in 10 ml. of dry tetrahydrofuran was added dropwise a solution of 1.3 g. of lithium aluminum tri-tert-butoxyhydride in 10 ml. of dry tetrahydrofuran. After stirring for 2 hours at room temperature the solution was cooled in an ice bath and 1.0 ml. of acetone was added. After 15 minutes the solution was poured into 150 ml. of chloroform and the chloroform solution was twice extracted, each time with 125 ml. of 10% acetic acid solution, then with 5% sodium bicarbonate solution. The aqueous washings were combined and extracted with ether. The combined organic layers were dried and the solvent was removed under reduced pressure giving 4,6-dichloro-3β,17α-dihydroxy-16-methylenepregna-4,6-dien-20-one 17-acetate which upon crystallization from methylene chloride-ether melted at 220–222°.

Example 50

A solution of 0.5 g. of 4,6-dichloro-3β,17α-dihydroxy-16-methylenepregna-4,6-dien-20-one 17-acetate, 5 ml. of distilled acetic anhydride, and 5 ml. of pyridine was stirred overnight at room temperature. The reaction mixture was then poured into 200 ml. of ice water and the product which precipitated was filtered and air-dried, yielding crude 4,6-dichloro-3β,17α-diacetoxy-16-methylenepregna-4,6-diene-20-one which upon crystallization from methylene chloride-ether melted at 227.5–229°.

Example 51

To 1.05 g. of 6-chloro-16α,17α-isopropylidenedioxypregna-4,6-diene-3,20-dione in 10 ml. of alcohol-free chloroform at 0° is added 2.8 ml. of 1.0 M solution of chlorine in carbon tetrachloride. After 1 hour at 3°, solvents are removed under reduced pressure and the residue treated with 12 ml. of pyridine. After standing at room temperature for 2 hours, the pyridine is removed under vacuum and the residue taken up in methylene chloride, washed with 2 N hydrochloric acid, water, dried (MgSO₄) and concentrated under reduced pressure. The residue is chromatographed on silica gel and the purified product is recrystallized from acetone/hexane to yield 4,6-dichloro - 16α,17α - isopropylidenedioxypregna-4,6-diene-3,20-dione.

Example 52

To a solution of 3.78 g. of 6-chloro-6-dehydro-17α-ethoxyprogesterone in 30 ml. of alcohol-free chloroform is added (at 0°) 13 ml. of a 0.8 molar solution of chlorine in carbon tetrachloride. The reaction mixture is allowed to stand for one hour at 0°. The solvent is then removed under reduced pressure and the residue treated with 5 ml. of dry pyridine. After one hour at room temperature 200 ml. of ether is added and the mixture washed with 1 N hydrochloric acid solution. This ether solution is then dried over magnesium sulfate and the solvent removed under reduced pressure. Chromatographic purification of the residue on silica gel, followed by crystallization of the product from methylenechloride-ether gives 4,6-dichloro-6-dehydro-17α-ethoxyprogesterone.

Example 53

To a cooled (−30°) solution of 500 mg. of 6-chloro-21-fluoro-17α-methyl-6-dehydroprogesterone in 7 ml. of ether, 3 ml. of dichloromethane and 10 ml. of dimethylformamide is added 1.31 mmoles of chlorine in propionic acid solution. The resultant solution is then allowed to stand at −15° for 18 hours and then at room temperature for 6 hours. The resulting mixture is poured into 200 ml. of water and is extracted three times with ether-dichloromethane (2.5:1). The organic layers are washed once with 5% sodium bicarbonate solution, once with brine, dried, and evaporated. The residue is crystallized from ether and recrystallized from dichloromethane-hexane to give 4,6-dichloro-21-fluoro-17α-methyl-6-dehydroprogesterone.

Example 54

A solution of 400 mg. of 6-chloro-1α,2α-methylene-6-dehydro-17α-acetoxyprogesterone in 10 ml. of 1:1 mixture of dichloromethane-ether is cooled to −20° and 1.0 mmole of a freshly prepared solution of chlorine in propionic acid is added. After 3 hours at −15°, the resultant solution is poured into sodium bisulfite solution and is extracted with dichloromethane. This extract is washed with water, dried, and concentrated. The residue is dissolved in 5 ml. of pyridine and is heated at 45° until thin layer chromatography shows that the reaction is complete. The mixture is then diluted with dichloromethane and ether and the organic layer is washed with 0.5 N hydrochloric acid solution, water, 5% sodium bicarbonate solution and is then dried and evaporated. The residue is dissolved in dichloromethane and purified by chromatography through a column of silica gel. The product crystallizes from dichloromethane-hexane and is recrystallized from dichloromethane-hexane to give 4,6-dichloro-1α,2α-methylene-6-dehydro-17α-acetoxyprogesterone.

Example 55

A solution of 480 mg. of 6-chloro-6-dehydro-17α-ethylprogesterone in 6 ml. of ether and 4 ml. of dichloromethane is cooled to −25° and 1.41 mmoles of chlorine in a propionic acid solution (freshly prepared and standardized) is added. The resultant mixture is kept at −15° overnight and is then diluted with dichloromethane and washed with aqueous sodium bisulfite solution, water, dried and concentrated. The residue is dissolved in 7 ml. of pyridine and is allowed to stand at room temperature for 24 hours. The reaction mixture is diluted with ether and the organic layer is washed with 1 N hydrochloric acid solution, 5% sodium bicarbonate solution, water and then dried and concentrated. The residue is crystallized from ether and recrystallized from acetone-hexane to give 4,6-dichloro-6-dehydro-17α-ethylprogesterone.

Example 56

A mixture containing 2 g. of 6α-fluoro-16α,17α-isopropylidenedioxy-4-pregnene-3,11,20-trione, 2 g. of chloranil and 150 ml. of t-butyl alcohol is refluxed for 18 hours. The cooled solution is diluted with 300 ml. of chloroform, washed three times with cold 5% sodium hydroxide solution, water, and is then dried over magnesium sulfate. The solvent is removed under reduced pressure and the crude 6-fluoro-16α,17α-isopropylidenedioxypregna - 4,6 - diene - 3,11,20-trione is purified by chromatography on neutral alumina followed by crystallization from methylene chloride-ether.

According to the above procedure treatment of: (1) 21-acetoxy - 6α - fluoro - 16α - fluoromethyl - 17α - hydroxy-4-pregnene-3,11,20-trione yields 21-acetoxy-6-fluoro-16α-fluoromethyl - 17α - hydroxypregna-4,6 - diene - 3,11,20-trione; (2) 6α-fluoro-16α,17α,21-trihydroxy - 4 - pregnene-3,11,20-trione yields 6-fluoro-16α,17α,21-trihydroxy-pregna-4,6-diene-3,11,20-trione; (3) 21 - acetoxy-6α,16α-difluoro - 17α - hydroxy - 4 - pregnene - 3,11,20 - trione yields 21 - acetoxy - 6,16α - difluoro - 17α - hydroxypregna-4,6-diene-3,11,20-trione.

To a solution of 4.16 g. of 6-fluoro-16α,17α-isopropylidenedioxypregna - 4,6 - diene - 3,11,20 - trione in 50 ml. of alcohol-free chloroform is added (at 0°) 17 ml. of a 0.6 molar solution of chlorine in carbon tetrachloride. The reaction mixture is allowed to stand for one hour at 0°. The solvent is then removed under reduced pressure and the residue is treated with 6 ml. of dry pyridine. After one hour at room temperature ether (200 ml.) is added and the mixture is washed with 1 N hydrochloric acid solution. The ether solution is dried over magnesium sulfate and the solvent is removed under reduced pressure. Chromatographic purification of the residue on silica gel followed by crystallization of the product from methylene chloride-ether gives 4-chloro-6-fluoro-16α,17α-isopropylidenedioxypregna-4,6-diene-3,11,20-trione.

According to the above procedure chlorination of: (1) 21 - acetoxy - 6 - fluoro - 16α - fluoromethyl - 17α - hydroxy-pregna-4,6-diene-3,11,20-trione yields 21-acetoxy-4-chloro - 6 - fluoro - 16α - fluoromethyl - 17α - hydroxy-pregna-4,6-diene-3,11,20-trione; (2) 6-fluoro - 16α,17α,21-trihydroxy - pregna - 4,6 - diene - 3,11,20 - trione yields 4 - chloro - 6 - fluoro - 16α,17α,21 - trihydroxy-pregna-4,6-diene-3,11,20-trione; (3) 21-acetoxy - 6,16α - difluoro-17α - hydroxy - pregna - 4,6 - diene - 3,11, 20 - trione yields 21 - acetoxy - 4 - chloro - 6,16α - difluoro - 17α - hydroxy-pregna-4,6-diene-3,11,20-trione.

Example 57

To a solution of 2.25 g. of 4-chloro-6-fluoro-16α,17α-isopropylidenedioxypregna-4,6-diene - 3,11,20 - trione dissolved in 75 ml. of dry tetrahydrofuran is added dropwise a solution of 3.8 g. of lithium aluminum tri-tertiary butoxy hydride dissolved in 30 ml. of dry tetrahydrofuran. The resultant solution is stirred for 2 hours at room temperature and is then cooled to 0°. Acetone (2 ml.) is then added and the solution is stirred for an additional fifteen minutes. The cooled mixture is then diluted with 300 ml. of chloroform and the chloroform solution is washed with a 10% acetic acid solution followed by 5% sodium bicarbonate solution and is then dried over magnesium sulfate. The solvent is removed under reduced pressure and the residue is crystallized from methylene chloride-ether to give 4 - chloro-6-fluoro-16α,17α-isopropylidenedioxypregna-4,6-diene-3β-ol-11,20-dione.

A mixture of 3 g. of 4-chloro-6-fluoro-16α,17α-ispropylidenedioxypregna - 4,6 - diene - 3β - ol - 11,20 - dione, 30 ml. of dry pyridine and 30 ml. of acetic anhydride is stirred for 18 hours at room temperature. The solution is then poured into 200 ml. of ice water and the product is filtered. Crystallization from methylene chloride-methanol gives 3β - acetoxy - 4 - chloro - 6 - fluoro - 16α,17α - isopropylidenedioxypregna-4,6-diene-11,20-dione.

Example 58

To 2.11 g. of 6-chloro-21-fluoro-17α-hydroxypregna-4,6-diene-3,20-dione 17-acetate in 10 ml. of ether and 10 ml. of dimethylformamide at 0° is added 5.5 ml. of a 1.0 molar solution of chlorine in propionic acid. The reaction is allowed to stand at —15° for 12 hours and then at room temperature for 5 hours. The resulting mixture is poured into 200 ml. of water and is extracted three times with ether-dichloromethane (2.5:1). The organic layer is washed with 5% sodium bicarbonate, water, dried (MgSO$_4$) and concentrated at reduced pressure. The residue is chromatographed on silica gel and the purified product is recrystallized from acetone/hexane to yield 17α-acetoxy - 4,6 - dichloro - 21 - fluoropregna- 4,6-diene-3,20-dione.

Example 59

A mixture of 15 g. of 16α-chloromethyl-17α-acetoxyprogesterone, 150 ml. of dioxane (purified over alumina), 20 ml. of triethyl orthoformate, 10 ml. of ethanol and 1.5 ml. of concentrated sulfuric acid is stirred at room temperature in the absence of light. After 2 hours the reaction mixture is poured with stirring into 3 liters of ice and water containing excess sodium bicarbonate. The resultant precipitate is collected by filtration, washed well with water and dissolved in dichloromethane. This solution is dried and concentrated to a semisolid residue which could be crystallized from ether to give 17α-acetoxy-16α-chloromethyl-3-ethoxypregna-3,5-diene-20-one but which normally is used directly for the next reaction.

According to the above procedure treatment of (1) 21 - acetoxy - 17α - hydroxy - 16 - methylene-4-pregnene-3,11,20-trione yields 21-acetoxy - 3 - ethoxy - 17α - hydroxy - 16 - methylene - pregna - 3,5 - diene-11,20-dione; (2) 17α-(2-chloroethynyl)-17β-hydroxy - androst - 4 - ene-3-one yields 17α-(2-chloroethynyl) - 3 - ethoxy-17β-hydroxy-androsta-3,5-diene.

A solution of the foregoing crude enol ether prepared from 15 g. of 16α - chloromethyl-17α-acetoxyprogesterone in 670 ml. of acetone is cooled to 5°. A solution of 14.2 g. of sodium acetate in 240 ml. of water is added thereto, followed by 27.6 g. of N-chlorosuccinimide and 17.2 ml. of acetic acid. After stirring for an additional 1.5 hours the reaction mixture is poured into 8 liters of water and ice. After stirring for an additional hour the slurry is filtered and the precipitate is dissolved in dichloromethane and dried. Removal of the solvent and crystallization of the residue from dichloromethane-ether gives 6β-chloro-16α-chloromethyl-17α-acetoxyprogesterone.

According to the above procedure treatment of: (1) 21-acetoxy - 3 - ethoxy - 17α - hydroxy - 16 - methylene-pregna-3,5-diene-11,20-dione yields 21-acetoxy-6β-chloro-17α-hydroxy-16-methylene - 4 - pregnene - 3,11,20-trione; (2) 17α - (2 - chloroethynyl) - 3 - ethoxy - 17β - hydroxy-androst - 3,5 - diene yields 6β-chloro-17α-(2-chloroethynyl)-17β-hydroxy-androst-4-ene-3-one.

A mixture of 10.0 g. of the foregoing 6β-chloro compound, 50 ml. of tetrahydrofuran (purified over alumina), 18 ml. of triethyl orthoformate, 5 ml. of ethanol and 100 mg. of p-toluenesulfonic acid is stirred at room temperature for 1.5 hours in the absence of light. The reaction mixture is then added in the course of 10 minutes to a stirred suspension of 45 g. of activated manganese dioxide in 450 ml. of acetic acid and 35 ml. of water. The resultant mixture is stirred for an additional hour and then filtered. The solid is washed well with dichloromethane and the combined filtrates are concentrated under vacuum. The oily residue is diluted with dichloromethane, washed three times with 5% sodium bicarbonate solution, once with water, dried and concentrated. The residue is crystallized with ether and then recrystallized from acetone-hexane to give purified 6-chloro-16α-chloromethyl-6-dehydro-17α-acetoxyprogesterone.

According to the above procedure treatment of: (1) 21-acetoxy - 6β - chloro-17α-hydroxy - 16 - methylene-4-pregnene-3,11,20-trione yields 21-acetoxy-6-chloro-17α-hydroxy-16-methylene-pregna - 4,6 - diene-3,11,20-trione; (2) 6β-chloro - 17α - (2 - chloroethynyl)-17β-hydroxy-androst - 4 - ene - 3 - one yields 6 - chloro-17α-(2-chloroethynyl)-17β-hydroxy-androsta-4,6-diene-3-one.

A solution of 1.00 g. of 6-chloro-16α-chloromethyl-6-dehydro-17α-acetoxyprogesterone in 22 ml. of dimethylformamide and 11 ml. of ether is cooled to 0° and 2.55 mmoles of chlorine in a propionic acid solution is added. The resultant solution is kept in the refrigerator for 12 hours and then at room temperature for 8 hours. The solution is then diluted with 2:5 dichloromethane-ether and washed with water, 5% sodium bicarbonate solution, water, dried and evaporated. The residue is crystallized from dichloromethane-hexane to give purified 4,6-dichloro-16α-chloromethyl-6-dehydro-17α-acetoxyprogesterone.

According to the above procedure chlorination of (1) 21-acetoxy-6-chloro-17α-hydroxy - 16 - methylene-pregna-4,6-diene-3,11,20-trione yields 21 - acetoxy-4,6-dichloro-17α-hydroxy - 16 - methylene-pregna-4,6-diene-3,11,20-trione; (2) 6-chloro-17α-(2-chloroethynyl)-17β-hydroxy-androsta-4,6-diene-3-one yields 17α-(2-chloroethynyl)-4,6-dichloro-17β-hydroxy-androsta-4,6-diene-3-one.

Example 60

To 1.051 g. of 6-chloro-17α-acetoxy-16α-methylpregna-4,6-diene-3,20-dione in 10 ml. of alcohol-free chloroform at 0° was added rapidly 2.97 ml. (0.00276 mole) of a 0.93 M solution of chlorine in carbon tetrachloride. After 1 hour at 3°, solvents were removed under reduced pressure and the crude product was treated with 6.5 ml. of pyridine. After standing at room temperature for 1 hour, the pyridine was removed under vacuum and the residue was taken up in methylene chloride, washed with dilute hydrochloric acid and water. The organic layer was dried (MgSO$_4$), concentrated under reduced pressure, and the crude product was chromatographed on 30 g. of silica gel. Elution of the product with 5% ethyl acetate in benzene and recrystallization of the combined fractions from ethyl acetate-hexane gave purified 4,6-dichloro-17α-hydroxy-16α-methylpregna-4,6-diene-3,20-dione acetate, M.P. 170–173°;

$$\lambda_{max.}^{EtOH} \text{ 299 m}\mu \text{ } (\epsilon \text{ 16,250})$$

Example 61

A solution of 0.300 g. of 4,6-dichloro-17α-acetoxy-16α-methylpregna-4,6-diene-3,20-dione in 10 ml. of anhydrous tetrahydrofuran was added dropwise over a 15-minute period of 0.511 g. (2.0 mmole) of lithium aluminum tri-t-butoxyhydride in 7 ml. of anhydrous tetrahydrofuran under a nitrogen atmosphere. After stirring at room temperature for 2 hours, 3 ml. of acetone was added followed by 1 ml. of water. The mixture was then concentrated under reduced pressure and 30 ml. of chloroform was added, followed by 30 ml. of 10% acetic acid in water. The resultant organic layer was washed with 5% sodium bicarbonate solution, dried (MgSO$_4$) and concentrated under reduced pressure. Crystallization of the residue from acetone-hexane gave 4,6-dichloro-3β,17α-dihydroxy-16α-methylpregna-4,6-diene-20-one 17-acetate which upon a second crystallization from acetone-hexane melted at 188.0–191.5°, $$\lambda_{max.}^{EtOH} \text{ 256 m}\mu \text{ } (\epsilon \text{ 17,900})$$

Example 62

To a cooled (5°) and stirred solution of 64.0 g. of 16β - methyl - 11α,17α,21 - trihydroxy-5α-pregnane-3,20-dione 21-acetate in 70 ml. of acetic acid and 700 ml. of dry dioxane, was added dropwise, over a 10-minute period 340 ml. of 0.92 molar solution of bromine in acetic acid. The reaction mixture was allowed to stir rapidly at 5–10° for 45 minutes and was then poured into 8 liters of water containing 98.0 g. of sodium acetate. The crystalline product was filtered, washed with water and dried under vacuum to give 79.0 g. of 2ξ,4ξ-dibromo-16β-methyl-11α,17α,21-trihydroxy - 5α - pregnane-3,20-dione 21-acetate, melting point 124–128°.

A solution of bromoacetone was prepared by adding rapidly 40 ml. of reagent grade bromine to 1200 ml. of acetone at 5°. After 20 minutes, 240 g. of anhydrous potassium carbonate was added and the mixture was allowed to stir at 5° for an additional 45 minutes. The reaction mixture was filtered and the filtrate stored in the refrigerator for use as described below.

To a stirred solution (25°) of 650 g. of sodium iodide in 2500 ml. of acetone was added 1100 ml. of freshly prepared bromoacetone solution. The stirred mixture was heated under reflux (nitrogen atmosphere) for 15 minutes and then a solution of 79.0 g. of 2ξ,4ξ-dibromo-16β-methyl-11α,17α,21-trihydroxy-5α-pregnane - 3,20 - dione 21-acetate in 500 ml. of acetone was added dropwise over a 5-minute period. The reaction mixture was stirred under reflux for 2¾ hours, and then a solution of 79.0 g. of oxalic acid in 500 ml. of acetone was added over a 5-minute period. The reaction mixture was stirred under reflux for an additional 45 minutes. The mixture was diluted with 3 liters of ethyl acetate, stirred for 5 minutes, filtered, and the residue was washed with 500 ml. of ethyl acetate. The filtrate was washed with 1500 ml. of water, 5% $NaHCO_3$ (1500 ml.) and brine (1500 ml.). The aqueous layers were extracted with two liters of ethyl acetate. The organic layers were then combined and dried over sodium sulfate.

To the dried ethyl acetate solution was added 250 ml. of glacial acetic acid followed portionwise with 250 g. of zinc dust. The mixture was cooled to room temperature and was stirred for 45 minutes. The reaction mixture was then filtered and the residue was washed with methylene chloride. The filtrate was washed with water, 5% sodium bicarbonate solution (1500 ml.) and brine (2000 ml.). The organic layer was dried over sodium sulfate, filtered and concentrated under vacuum. The residue was crystallized from acetone to give 19.70 g. of 16β-methyl-11α,17α,21-trihydroxypregn-4-ene-3,20-dione 21-acetate, melting point 233–240°.

Example 63

To a solution of 28.0 g. of 16β-methyl-11α,17α,21-trihydroxypregn-4-ene-3,20-dione 21-acetate in 550 ml. of dry dioxane and 550 ml. of absolute alcohol was added 33.0 ml. of triethyl orthoformate and 2.0 g. of p-toluene sulfonic acid. The reaction mixture was stirred in the dark at room temperature (nitrogen atmosphere) for two hours and was then diluted with 2.5 liters of water containing 10 ml. of pyridine. The mixture was extracted three times with ether:methylene chloride (4:1) and the organic layers were washed twice with water and were then combined, dried ($Na_2SO_4$) and concentrated under reduced pressure to yield 30.0 g. of crude 3-ethoxy-16β-methyl-11α,17α,21-trihydroxy-pregna-3,5-diene 21-acetate.

To a stirred solution of 30.0 g. of so-prepared 3-ethoxy - 16β - methyl-11α,17α,21-trihydroxy-pregna-3,5-diene 21-acetate in 535 ml. of acetone was added a solution of 10.60 g. of sodium acetate in 170 ml. of water. The mixture was cooled (5°), and 19.50 g. of N-chlorosuccinimide was added followed by 10.6 ml. of glacial acetic acid. The reaction mixture was stirred at 5° for 70 minutes and was then diluted with two liters of water. The mixture was extracted three times with ether:methylene chloride (3:1). The organic layers were washed once with 5% sodium bicarbonate solution, three times with water and once with brine. The organic layers were combined, dried ($Na_2SO_4$) and concentrated to yield 37.0 g. of a crude oil which was purified by chromatography on 700 g. of synthetic magnesia-silica gel (Florisil, available from The Floridin Company, Box 989, Tallahassee, Fla.) in benzene. Elution with benzene:ethyl acetate yielded 30.0 g. of the crude 6β-chloro-16β-methyl-11α,17α,21-trihydroxypregn-4-ene-3,20-dione 21-acetate.

To a solution of 30.0 g. of the so-prepared crude 6β-chloro - 16β - methyl-11α,17α,21-trihydroxy-pregn-4-ene-3,20-dione 21-acetate in 600 ml. of dry dioxane and 600 ml. of absolute alcohol was added 34.5 ml. of triethyl orthoformate and 3.45 g. of p-toluene-sulfonic acid. The reaction mixture was stirred in the dark at room temperature (nitrogen atmosphere) for 90 minutes and was then diluted with 2.5 liters of water containing 10 ml. of pyridine. The mixture was extracted three times with ether and the ether layers were washed twice with water. The organic layers were combined, dried ($Na_2SO_4$) and concenrated under reduced pressure to yield 32.0 g. of an oil which was purified by chromatography on 600 g. of synthetic magnesia-silica gel (Florisil, available from The Floridin Company, Box 989, Tallahassee, Fla.). Elution with benzene-ethyl acetate gave 23.0 g. of 6-chloro-3-ethoxy - 16β - methyl-11α,17α,21-trihydroxy-pregna-3,5-diene-20-one 21-acetate, sufficiently pure for the next step.

To a solution of 23.0 g. of the so-prepared 6-chloro-3-ethoxy - 16β - methyl - 11α,17α,21-trihydroxy-pregna-3,5-diene-20-one 21-acetate in 920 ml. of glacial acetic acid and 75 ml. of water was added 81.0 g. of activated manganese dioxide. The reaction mixture was stirred at room temperature in the dark (nitrogen atmosphere) for 3¼ hours and was then filtered. The filtrate was evaporated to dryness and the residue was dissolved in chloroform. The organic layer was washed once with water, twice with 5% sodium bicarbonate solution, once with 1 N hydrochloric acid solution and once with brine. The organic layers were combined, dried ($Na_2SO_4$) and evaporated yielding 20 g. of an oil which was triturated with ethyl acetate and ether to give 6.10 g. of 6-chloro-11α,17α, 21 - trihydroxy-16β-methylpregna-4,6-diene-3,20-dione 21-acetate which upon crystallization from acetone-ether melted at 200–200.5°.

Example 64

To a cooled solution (0°) of 0.40 g. of 6-chloro-11α,17α,21 - trihydroxy-16β-methylpregna-4,6-diene-3,20-dione 21-acetate in 25 ml. of chloroform was added 0.86 ml. of a 1.15 molar solution of chlorine in carbon tetrachloride. The mixture was maintained at 0° for 30 minutes and the solvents were then removed under reduced pressure. Pyridine (2.5 ml.) was added to the residue and the mixture was allowed to stand at 25° for 70 minutes. The pyridine was then removed under reduced pressure and the resulting crude oil was dissolved in methylene chloride. The organic layer was washed twice with 1 N hydrochloric acid solution and once with water. The organic layer was then dried ($Na_2SO_4$) and concentrated under reduced pressure to give an oil which was chromatographed on 15.0 g. of silica gel. The column was eluted with benzene-ethyl acetate giving 272 mg. of an oil which crystallized on addition of ether. The solvent was removed and the crude solid was crystallized from methylene chloride-ether yielding 4,6 - dichloro-11α,17α,21-trihydroxy-16β - methylpregna-4,6-diene-3,20-dione 21-acetate, M.P. 198.5–200.5° (dec.); $\lambda_{max}$. 300 mμ (ε 18,000); $[\alpha]_D^{26}$ +229.2° (c. 0.53 in $CHCl_3$).

Example 65

To a stirred solution of 0.50 g. of 4,6-dichloro-11α,17α, 21-trihydroxy-16β-methylpregna-4,6-diene-3,20-dione 21-acetate in 20 ml. of acetone, cooled to 5°, is added 1.0 ml.

of a chromic acid solution (a stock solution is prepared by diluting with water a solution of 26.72 g. chromium trioxide in 23 ml. of concentrated sulfuric acid to a final volume of 100 ml.). The resulting mixture is stirred at 5° for an additional 10 minutes and the excess chromic acid is then decomposed by the addition of a few drops of isopropanol. The reaction mixture is then diluted with water and is extracted three times with ether-methylene chloride (3:1). The organic layer is washed with 5% sodium bicarbonate solution and water. The combined organic layers are dried ($Na_2SO_4$) and evaporated under reduced pressure. The residue is crystallized from acetone-ether to give 4,6 - dichloro-17α,21-dihydroxy-16β-methylpregna-4,6-diene-3,11,20-trione 21-acetate.

According to the above procedure 4,6 - dichloro-9α-fluoro - 11β,17α,21 - trihydroxy-16β-methylpregna-4,6-diene-3,20-dione 21-acetate is oxidized to 4,6-dichloro-9α-fluoro - 17α,21 - dihydroxy - 16β-methylpregna-4,6-diene-3,11,20-trione 21-acetate.

Example 66

To a solution of 0.53 g. of 4,6-dichloro-11α,17α,21-trihydroxy - 16β-methylpregna-4,6-diene-3,20-dione 21-acetate in 9 ml. of glacial acetic acid was added dropwise over a 10-minute period 1.25 ml. of a 1.0 molar solution of chlorine in acetic acid. The reaction mixture was allowed to stand at room temperature for 20 minutes and was then diluted with 4.0 ml. of water. The resulting precipitate was filtered, washed with water and dried to give 2α,4,6-trichloro - 11α,17α,21 - trihydroxy-16β-methylpregna-4,6-diene-3,20-dione 21-acetate, M.P. 234–236.5°, which can be recrystallized from acetone/methanol.

According to the above procedure chlorination of 4,6-dichloro - 9α - fluoro-17α,21-dihydroxy-16β-methylpregna-4,6-diene-3,11,20-trione 21-acetate yields 2α,4,6-trichloro-9α - fluoro-17α,21-dihydroxy-16β-methylpregna-4,6-diene-3,11,20-trione 21-acetate.

Example 67

A solution of 4.0 g. of 2α,4,6-trichloro-11α,17α,21-trihydroxy - 16β - methylpregna - 4,6 - diene-3,20-dione 21-acetate and 0.85 g. of lithium chloride in 85 ml. of dimethylformamide was heated under reflux for 30 minutes. The reaction mixture was then cooled, diluted with one liter of water and the resulting precipitate was filtered, washed with water and dried. The product was purified by chromatography on silica gel. Elution with a mixture of benzene and ethyl acetate (2:3) gave 4,6-dichloro-11α,17α,21-trihydroxy - 16β - methylpregna-1,4,6-triene-3,20-dione 21-acetate.

According to the above procedure treatment of 2α,4,6-trichloro - 9α - fluoro-17α,21-dihydroxy-16β-methylpregna-4,6-diene-3,11,20-trione 21-acetate with lithium chloride in dimethylformamide yields 4,6-dichloro - 9α - fluoro-17α,21-dihydroxy - 16β - methylpregna - 1,4,6 - triene-3,11,20-trione 21-acetate.

Example 68

A stirred solution of 2.0 g. of 4,6-dichloro-11α,17α,21-trihydroxy - 16β - methylpregna - 1,4,6 - triene-3,20-dione 21-acetate in 15 ml. of pyridine was cooled to 5° and 1.0 ml. of methanesulfonyl chloride was added over a 5-minute period. The reaction mixture was allowed to stir 30 minutes longer at 5° and then for 1 hour at room temperature. The reaction mixture was poured into 250 ml. of cold water and extracted three times with ether-methylene chloride (3:1). The organic layers were washed twice with 1 N hydrochloric acid solution, once with 5% sodium bicarbonate solution and once with brine. The combined organic layers were dried ($Na_2SO_4$) and evaporated to give 4,6-dichloro - 11α,17α,21 - trihydroxy - 16β - methylpregna - 1,4,6 - triene-3,20-dione 11-mesylate 21-acetate.

Example 69

A solution of 2.0 g. of 4,6-dichloro - 11α,17α,21 - trihydroxy - 16β - methylpregna - 1,4,6 - triene-3,20-dione 11-mesylate 21-acetate and 6 g. of sodium acetate in 40 ml. of glacial acetic acid was heated under reflux for one hour. The cooled reaction mixture was poured into 100 ml. of cold water and the resulting precipitate was filtered, washed with water and dried. The product was purified by chromatography on silica gel to give 4,6-dichloro-17α,21-dihydroxy - 16β - methylpregna-1,4,6,9(11)-tetraene-3,20-dione 21-acetate.

Example 70

To a stirred solution of 1.0 g. of 4,6-dichloro-17α,21-dihydroxy - 16β - methylpregna - 1,4,6,9(11) - tetraene-3,20-dione 21-acetate in 25 ml. of tetrahydrofuran is added 4.7 ml. of aqueous 0.46 N perchloric acid followed by 0.40 g. of N-bromoacetamide. The mixture is stirred in the dark at 25° for 4 hours and is then treated with enough saturated aqueous sodium sulfite solution to discharge the excess hypobromous acid. The reaction mixture is poured into cold water and the resulting precipitate is filtered, washed with water and dried to give 9α-bromo-4,6-dichloro-11β,17α,21-trihydroxy - 16β - methylpregna-1,4,6-triene-3,20-dione 21-acetate.

Example 71

To a stirred and cooled (0–5°) solution (nitrogen atmosphere) of 9α-bromo - 4,6 - dichloro-11β,17α,21-trihydroxy - 16β - methylpregna - 1,4,6 - triene - 3,20 - dione 21-acetate (0.84 g.) in 42 ml. of methanol-chloroform mixture (3:2) is added dropwise 1.5 ml. of 1 N sodium hydroxide solution over a one-hour period. Stirring is continued for an additional 2 hours and the mixture is then neutralized by the addition of acetic acid. The solution is concentrated under reduced pressure to about 5 ml. and 40 ml. of cold water is added with stirring. The resulting product is filtered, washed with water and dried. Chromatographic purification on a column of silica gel gives 4,6-dichloro-17α,21-dihydroxy - 9,11β - oxido-16β-methylpregna-1,4,6-triene-3,20-dione.

Example 72

To 2.5 ml. of 70% aqueous hydrogen fluoride (cooled to —30°) in a polyethylene flask is added, portionwise and with stirring, 0.5 g. of 4,6-dichloro-17α,21-dihydroxy-9,11β-oxido - 16β - methylpregna - 1,4,6 - triene-3,20-dione. The temperature is maintained at —20° to —30° and stirring is continued for a total of 4 hours. The reaction mixture is then poured into a solution of 8.75 g. of potassium carbonate in 10 ml. of water. The resulting precipitate is filtered, washed with water and dried to give 4,6-dichloro - 9α - fluoro-11β,17α,21-trihydroxy-16β-methylpregna-1,4,6-triene-3,20-dione.

Example 73

To a solution of 0.25 g. of 4,6 - dichloro - 9α - fluoro-11β,17α,21-trihydroxy - 16β - methylpregna - 1,4,6 - triene-3,20-dione in 1.0 ml. of pyridine is added at room temperature 0.25 ml. of acetic anhydride. The reaction is allowed to stand at room temperature for 1.5 hours and is then poured into 10 ml. of cold water containing 1.5 ml. of concentrated hydrochloric acid. The resulting precipitate is filtered, washed with water and dried. Crystallization from acetone-ether gives 4,6-dichloro-9α-fluoro-11β,17α,21-trihydroxy - 16β - methylpregna-1,4,6-triene-3,20-dione 21-acetate.

Example 74

A solution of 0.466 g. of 4,6-dichloro - 17α,21 - dihydroxy - 16β - methyl-1,4,6,9(11)-tetraene-3,20-dione 21-acetate in pyridine (4.5 ml.) and dichloromethane (4.5 ml.) is cooled to —50° and is treated with 1.0 ml. of a solution of chlorine in carbon tetrachloride (71 mg. chlorine/ml.). The mixture is then warmed to room temperature over a 10-minute period. The reaction mixture is

37 diluted with 20 ml. of methylene chloride and is washed with water, 2 N hydrochloric acid solution and water. The combined organic layers are dried (Na$_2$SO$_4$) and evaporated under reduced pressure to give 4,6,9α,11β-tetrachloro - 17α,21-dihydroxy - 16β - methylpregna-1,4,6-triene-3,20-dione 21-acetate.

Example 75

A solution of 20.0 g. of 6-chloro-17α-acetoxy-pregna-4,6-diene-3,20-dione in 200 ml. of dimethylformamide and 100 ml. of ether was cooled to about 0°. To this was added 53 ml. of a 1.0 molar solution of chlorine in propionic acid over 10 minutes. The mixture was allowed to remain overnight at 0 to +3°, 6 hours at room temperature and then it was diluted with water and extracted with an ether/methylene chloride mixture (2.5/1.0). The organic phase was washed with 5% aqueous sodium bicarbonate solution and dried over sodium sulfate and evaporated to give 25.5 g. crude product.

The crude product was then chromatographed on 1250 g. of synthetic magnesia-silica gel (Florisil, available from The Floridin Company, Box 989, Tallahassee, Fla.) and eluted with benzene and benzene/ethyl acetate mixtures. An early fraction [(2%) ethyl acetate-benzene] afforded 1.6 g. of a mixture rich in 2α,4,6-trichloro17α-acetoxy-pregna-4,6-diene-3,20-dione. The later fractions afforded 7.35 g. of the major product, 4,6-dichloro-17α-acetoxy-pregna-4,6-diene-3,20-dione.

The 1.6 g. fraction was rechromatographed on 96 g. of silica gel, using the same solvent system as above and 0.64 g. of crude product was obtained. Trituration with ether yielded 0.27 g. of insoluble white solid. Crystallization from methylene chloride/ether afforded 2α,4,6-trichloro-17α-acetoxy-pregna-4,6-diene-3,20-dione as colorless crystals, M.P. 220–226° [dec. and sintering (variable melting point)]; $[\alpha]_D^{25}$+139° (c. 1.01 in CHCl$_3$);

$\lambda_{max.}^{EtOH}$ 301 mµ (ε 17100)

Example 76

A solution of 4.0 g. of 4,6-dichloro-17α-acetoxy-pregna-4,6-diene-3,20-dione in 40 ml. of glacial acetic acid was treated at room temperature over 10 minutes with 10.6 ml. (1.15 equivalents) of a 0.948 molar solution of chlorine in acetic acid and allowed to react overnight at room temperature. The crude product was isolated by dilution with water and extraction with methylene chloride in the usual manner to give 4.3 g. of crude product. Chromatography on 129 g. of silica gel, with benzene, afforded from the early fractions 1.97 g. of solid 2α,4,6-trichloro-17α-acetoxy-pregna-4,6-diene - 3,20 - dione. A sample was crystallized from methylene chloride/ether and melted at 228–235.5° (dec., sintering).

Example 77

A solution of 1.2 g. of 2α,4,6-trichloro-17α-acetoxy-pregna-4,6-diene-3,20-dione and 0.25 g. of lithium chloride in 25 ml. of dimethylformamide were refluxed for 30 minutes, under nitrogen. The reaction mixture was poured into water and extracted with methylene chloride. The organic phase was washed with water, dried over sodium sulfate, and the solvent removed in vacuo. The residue was chromatographed on 30 g. of alumina (Woelm, activity II, neutral) using benzene and benzene/methylene chloride, and the crude product was crystallized once from methylene chloride/benzene to give 0.81 g. of colorless needles of 17α-acetoxy-4,6-dichloro-pregna-1,4-6-triene-3,20-dione, M.P. 228–229°; $[\alpha]_D^{25}$+18.0° (c. 0.90 in CHCl$_3$);

$\lambda_{max.}^{EtOH}$ 233–234 mµ (ε 13600), 260–263 (ε 7900), and 308 mµ (ε 9220)

Example 78

A solution of 500 mg. of 4,6-dichloro-9α-fluoro-11β,17α,21-trihydroxy-16β-methylpregna - 4,6 - diene - 3,20-dione, 300 mg. of trimethyl orthovalerate and 14 mg. of p-toluenesulfonic acid in 250 ml. of benzene is heated under reflux (Dean-Stark trap) for 90 minutes. The cooled reaction mixture is extracted with 5% sodium carbonate, dried, and concentrated under vacuum to an oil. This residue is crystallized from ether and recrystallized from acetone-hexane containing a trace of pyridine to give the 17α,21-methylorthovalerate of 4,6-dichloro-9α-fluoro-11β,17α,21-trihydroxy - 16β - methylpregna-4,6-diene-3,20-dione.

According to the above procedure treatment of 4,6-dichloro-9α-fluoro-11β,17α,21-trihydroxy - 16β - methylpregna-1,4,6 - triene - 3,20 - dione with trimethyl orthovalerate and para-toluenesulfonic acid yields 17α,21-methylorthovalerate of 4,6-dichloro - 9α - fluoro-11β,17α,21-trihydroxy-16β-methylpregna-1,4,6-triene-3,20-dione.

Example 79

A mixture of 350 mg. of the 17α,21-methylorthovalerate of 4,6-dichloro-9α-fluoro-11β,17α,21 - trihydroxy-16β-methylpregna-4,6-diene-3,20-dione and 5.0 ml. of a 2% solution of water in acetic acid is stirred at room temperature overnight. The solution is poured into 100 ml. of ice water. The resulting precipitate is collected by filtration, washed well with water and recrystallized from dichloromethane-hexane to give 4,6-dichloro-9α-fluoro-11β,17α,21-trihydroxy - 16β - methylpregna - 4,6-diene-3,20-dione 17-valerate.

According to the above procedure treatment of the 17α,21-methylorthovalerate of 4,6-dichloro-9α-fluoro-11β,17α,21-trihydroxy-16β-methylpregna-1,4,6-triene-3,20 - dione yields 4,6-dichloro-9α-fluoro-11β,17α,21-trihydroxy - 16β-methylpregna-1,4,6-triene-3,20-dione 17-valerate.

Example 80

A solution of 553 mg. of 4,6-dichloro-9α-fluoro-11β,17α,21-trihydroxy-16β-methylpregna - 4,6 - diene - 3,20-dione 17-valerate in 1 ml. of acetic anhydride and 3 ml. of pyridine is allowed to stand at room temperature overnight. The reaction mixture is poured into 50 ml. of ice water and stirred at 0° for 1 hour. The resulting precipitate is collected by filtration, washed with water, dried and recrystallized from dichloromethane-hexane to give 4,6-dichloro-9α-fluoro-11β,17α,21-trihydroxy-16β- methylpregna-4,6-diene-3,20-dione 17-valerate 21-acetate.

According to the above procedure treatment of 4,6-dichloro-9α-fluoro-11β,17α,21-trihydroxy - 16β - methylpregna-1,4,6-triene-3,20-dione 17-valerate yields 4,6-dichloro-9α-fluoro-11β,17α,21 - trihydroxy - 16β methylpregna-1,4,6-triene-3,20-dione 17-valerate 21-acetate.

Example 81

To a suspension of 1.0 g. of 4,6,9α,11β-tetrachloro-17α,21-dihydroxy-16β-methylpregna-1,4,6-triene-3,20 - dione 21-acetate in 100 ml. of methanol is added a solution of 1.0 g. of potassium bicarbonate in 10 ml. of water. The reaction mixture is stirred overnight at room temperature and the solution is then diluted with 200 ml. of brine. The resulting precipitate is filtered, washed with water and dried to give 4,6,9α,11β-tetrachloro - 17α,21 - dihydroxy-16β-methylpregna-1,4,6-triene-3,20-dione.

Example 82

A mixture of 400 mg. of 4,6,9α,11β-tetrachloro-17α,21-dihydroxy-16β-methylpregna-1,4,6-triene - 3,20 - dione, 6 ml. of propionic acid and 2.0 ml. of trifluoroacetic anhydride is heated at 90° for 2 hours. The cooled reaction mixture is poured slowly into 100 ml. of ice and water. After stirring the reaction mixture for one hour, the resultant precipitate is collected by filtration, washed well with water, dried and crystallized from dichloromethane-hexane to give 4,6,9α,11β-tetrachloro-17α,21-dihydroxy-16β-methylpregna-1,4,6-triene - 3,20 - dione 17,21-dipropionate.

Example 83

A solution of 500 mg. of 9α-fluoro-4,6-dichloro-11β,17α,21-trihydroxy-16β-methylpregna - 1,4,6 - triene-3,20-dione, 332 mg. of β-cyanoethyl phosphate and 1.82 g. of N,N'-dicyclohexylcarbodimide in 50 ml. of dry pyridine is stirred at room temperature for 2 days. Seven milliliters of water is added and after standing at 5° for 2 days the solvents are removed under reduced pressure. The residue is stirred at room temperature for 2 hours with 200 ml. of 50% methanol and 8.8 ml. of 5% sodium hydroxide solution. Dilute hydrochloric acid is added until the solution is pH 4 and the mixture is filtered. The filtrate is adjusted to pH 9 with sodium hydroxide. A solution of 450 mg. of piperazine acetate in water is added, the precipitate is collected by filtration, washed well with water and dried to give crude 9α-fluoro-4,6-dichloro-11β,17α,21-trihydroxy-16β-methylpregna - 1,4,6 - triene-3,20-dione 21-phosphate piperazinium salt. This material is stirred for one hour with a suspension of excess of polystyrene nuclear sulfonic acid ion exchange resin (Dowex 50–8X) (H+ form) in methanol. The resin is removed by filtration and the solution is concentrated in vacuo. The residue is crystallized from acetone-hexane to give 9α-fluoro-4,6-dichloro-11β,17α,21-trihydroxy - 16β - methylpregna-1,4,6-triene-3,20-dione 21-dihydrogen phosphate. This dihydrogen phosphate compound is dissolved in water and passed through a column containing excess methacrylic carboxylic acid ion exchange resin (Na+ form) (Amberlite IRC–50). Lyophilization of the eluate then gives 9α-fluoro-4,6-dichloro - 11β,17α,21 - trihydroxy-16β-methylpregna-1,4,6-triene-3,20-dione 21-disodium phosphate as an amorphous solid.

Example 84

A stirred solution of 1.5 g. of 4,6-dichloro-11α,17α,21-trihydroxy-16β-methylpregna-4,6-diene-3,20-dione 21-acetate in 15 ml. of pyridine was cooled to 5° and 0.75 ml. of methanesulfonyl chloride was added over a 5-minute period. The reaction mixture was allowed to stir 30 minutes longer at 5° and then for 1 hour at room temperature. The reaction mixture was then poured into 100 ml. of cold water and was extracted three times with ether-methylene chloride (3:1). The organic layers were washed twice with 1 N hydrochloric acid solution and once with water. The combined organic layers were dried (Na₂SO₄) and evaporated to give 4,6 - dichloro-11α,17α,21-trihydroxy-16β-methylpregna-4,6-diene - 3,20 - dione 11-mesylate 21-acetate.

Example 85

A solution of 1.5 g. of 4,6-dichloro-11α,17α,21-trihydroxy-16β-methylpregna-4,6-diene-3,20-dione 11-mesylate 21-acetate and 4.35 g. of sodium acetate in 30 ml. of glacial acetic acid was heated under reflux for one hour. The cooled reaction mixture was diluted with 70 ml. of cold water and the resulting precipitate was filtered, washed with water and dried. One crystallization from methanol gave 4,6-dichloro-17α,21-dihydroxy-16β-methylpregna-4,6,9(11)-triene-3,20-dione 21-acetate, M.P. 205–209°.

Example 86

To a stirred solution of 0.50 g. of 4,6-dichloro-17α,21-dihydroxy-16β-methylpregna-4,6,9(11) - triene-3,20-dione 21-acetate in 10 ml. of tetrahydrofuran was added 4.5 ml. of aqueous 0.60 normal perchloric acid followed by 0.50 g. of N-bromoacetamide. The mixture was stirred in the dark at 30° for 4 hours and was then treated with enough saturated aqueous sodium sulfite solution to discharge the excess hypobromous acid. The reaction mixture was then diluted with cold water and was extracted twice with ether-dichloromethane (3:1). The organic layers were washed twice with water, dried, and concentrated. The residue was dissolved in benzene and purified over a silica gel column to give 9α-bromo-4,6-dichloro - 11β,17α,21 - trihydroxy-16β-methylpregna-4,6-diene-3,20-dione 21 - acetate, M.P. 147–150°.

Example 87

To a stirred and cooled (0–5°) solution (nitrogen atmosphere) of 9α - bromo-4,6-dichloro-11β,17α,21-trihydroxy-16β-methylpregna-4,6-diene-3,20-dione 21 - acetate (0.84 g.) in 42 ml. of methanolchloroform mixture (3:2) was added dropwise 1.5 ml. of 1 N sodium hydroxide solution over a one-hour period. Stirring was continued for an additional 2 hours and the mixture was then neutralized by the addition of acetic acid. The solution was concentrated under reduced pressure to a thick slurry and 40 ml. of cold water was added with stirring. The resulting product was filtered, washed with water and dried. Chromatographic purification on a column of silica gel gave 4,6-dichloro-17α,21-dihydroxy-9,11β-oxido - 16β - methylpregna-4,6-diene-3,20-dione, M.P. 215–220°.

Example 88

To a stirred and cooled (−30°) solution of 0.04 g. of 4,6-dichloro-17α,21-dihydroxy-9,11β-oxido - 16β - methylpregna-4,6-diene-3,20-dione in 1.0 ml. of chloroform in a polyethylene flask was added 1.0 ml. of 70% aqueous hydrogen fluoride. The resulting mixture was stirred for 6 hours at −20° and was then treated to at least neutrality with an excess of sodium carbonate solution. The mixture was then extracted with chloroform. The organic layers were washed with water, combined, dried (Na₂SO₄) and evaporated. The residue was chromatographed on silica gel to give 4,6-dichloro-9α-fluoro-11β,17α,21-trihydroxy-16β-methylpregna-4,6-diene-3,20-dione.

Example 89

To a solution of 0.25 g. of 4,6-dichloro-9α-fluoro-11β,17α,21 - trihydroxy - 16β - methylpregna-4,6-diene-3,20-dione in 1.0 ml. of pyridine is added at room temperature 0.25 ml. of acetic anhydride. The reaction mixture is allowed to stand at room temperature for 1.5 hours and is then poured into 10 ml. of cold water containing 1.5 ml. of concentrated hydrochloric acid. The resulting precipitate is filtered, washed with water and dried. Crystallization from acetone-ether gives 4,6-dichloro-9α-fluoro-11β,17α,21-trihydroxy-16β-methylpregna-4,6-diene - 3,20-dione 21-acetate.

Example 90

To a solution of 0.503 g. of 4,6-dichloro-9α-fluoro-11β,17α,21-trihydroxy-16β-methylpregna-4,6-diene-3,20-dione 21-acetate in 10 ml. of glacial acetic acid is added dropwise over a 10-minute period 1.1 ml. of a 1.0 molar solution of chlorine in acetic acid. The reaction mixture is allowed to stand at room temperature overnight and is then diluted with 100 ml. of water and is extracted three times with ether-methylene chloride (3:1). The organic layers are washed twice with 5% sodium bicarbonate solution and once with brine. The combined organic layer are dried (Na₂SO₄) and evaporated under reduced pressure. The residue is chromatographed on silica gel to give 2α,4,6-trichloro-9α-fluoro-11β,17α,21-trihydroxy-16β-methylpregna-4,6-diene-3,20-dione 21-acetate.

Example 91

A solution of 0.6 g. of 2α,4,6 - trichloro - 9α - fluoro-11β,17α,21 - trihydroxy - 16β - methylpregna - 4,6 - diene-3,20-dione 21-acetate and 0.15 g. of lithium chloride in 15 ml. of dimethylformamide is heated under reflux for 30 minutes. The reaction mixture is then cooled and diluted with 150 ml. of water. The resulting mixture is extracted three times with ether-methylene chloride (3:1) and the organic layers are washed twice with water and once with brine. The combined organic layers are dried (Na₂SO₄) and evaporated to dryness under reduced pressure. The residue is purified by chromatography on silica gel to give 4,6 - dichloro - 9α - fluoro - 11β,17α,21 - trihydroxy - 16β - methylpregna - 1,4,6 - triene 3,20 - dione 21-acetate.

Example 92

A solution of 280 mg. of 4,6 - dichloro - 17β - hydroxy-19 - nor - 17α - pregna - 4,6 - diene - 20 - yn - 3 - one in 10 ml. of anhydrous tetra hydrofuran was added dropwise to a mixture of 600 mg. of lithium aluminum tri-t-butoxyhydride and 15 ml. of anhydrous tetrahydrofuran under a nitrogen atmosphere. The reaction mixture was stirred at room temperature for 1½ hours and 5 ml. of acetone was added followed by 100 ml. of 5% acetic acid in water. The mixture was extracted twice with dichloromethane and the combined extracts were washed twice with 5% sodium bicarbonate, dried with sodium sulfate and concentrated under vacuum. The resulting crude solid was recrystallized from dichloromethane-ether to give 4,6 - dichloro - 3β,17β - dihydroxy - 19 - nor - 17α-pregna - 4,6 - diene - 20 - yne, melting point 185–190°.

Example 93

A mixture (initially heterogeneous) of 430 mg. of 4,6-dichloro - 3β,17β - dihydroxy - 19 - nor - 17α - pregna-4,6-diene-20-yne, 25 ml. of glacial acetic acid, 10 ml. of acetic anhydride and 430 mg. of p-toluenesulfonic acid monohydrate is stirred at room temperature overnight. The solution is then poured into 800 ml. of ice water and after one hour the precipitate is removed by filtration and washed well with water. The solid is dissolved in dichloromethane and the solution is dried and concentrated. The residual oil is crystallized on trituration with ether and is recrystallized from dichloromethane-hexane to give 4,6 - dichloro - 3β,17β - dihydroxy - 19 - nor - 17α-pregna-4,6-diene-20-yne diacetate.

Example 94

To a solution of 450 mg. of 17β-hydroxy-6,21-dimethyl-17α-pregna-4,6-diene-20-yn-3-one in 6 ml. of ether and 2 ml. of dichloromethane cooled to —30° is added 1.45 mmoles of a chlorine in propionic acid solution. After standing at —15° for 30 minutes the solution is poured into water containing excess sodium bisulfite. The mixture is extracted with dichloromethane and this extract is washed with water, dried and concentrated. The residue is dissolved in 5.0 ml. of pyridine and allowed to stand at room temperature for 2 days. The solution is then poured into cold water, and the resulting precipitate is filtered, washed with water and dried to give 4-chloro-17β - hydroxy - 6,21 - dimethyl - 17α - pregna - 4,6-diene-20-yn-3-one.

Example 95

A solution of 750 mg. of 4,6-dichloro-17α-hydroxy-pregna-4,6-diene-3,20-dione, 500 mg. of p-toluenesulfonic acid and 2.00 g. of dichloroacetic acid in 75 ml. of benzene is heated under reflux (Dean-Stark trap) overnight. The cooled reaction mixture is poured into a mixture of ice and water containing excess sodium bicarbonate. The benzene layer and one dichloromethane extract of the aqueous layer are combined, dried, and concentrated to give 4,6 - dichloro - 17α - hydroxypregna - 4,6 - diene-3,20-dione dichloroacetate.

Example 96

A tablet formulation of 17α-acetoxy-4,6-dichloro-16-methylenepregna-4,6-diene-3,20-dione is prepared as described:

| | Per tablet mg. |
|---|---|
| 17α - acetoxy - 4,6 - dichloro - 16 - methylene-pregna-4,6-diene-3,20-dione | 2.0 |
| Lactose | 121.5 |
| Corn starch | 70.5 |
| Pregelatinized corn starch | 8.0 |
| Calcium stearate | 3.0 |
| Total weight | 205.0 |

17α - acetoxy - 4,6 - dichloro - 16 - methylenepregna-4,6-diene-3,20-dione is mixed with the lactose, corn starch and pregelatinized corn starch in a suitable size mixer. The mix is passed through a comminuting machine fitted with No. 1A screen and with knives forward. The mix is returned to the mixer and moistened with water to a thick paste. The moist mass is passed through a No. 12 screen and the moist granules are dried on paper lined trays at 110° F. The dried granules are returned to the mixer, the calcium stearate is added and mixed well. The granules are compressed at a tablet weight of 205 mg., using standard concave punches having a diameter of 5/16″.

Example 97

A capsule formulation of 17α-acetoxy-4,6-dichloro-16-methylenepregna-4,6-diene-3,20-dione is prepared as described:

| | Per capsule, mg. |
|---|---|
| 17α - acetoxy - 4,6 - dichloro - 16 - methylenepregna-4,6-diene-3,20-dione | 5 |
| Lactose | 178 |
| Corn starch | 37 |
| Talc | 5 |
| Total weight | 225 |

17α - acetoxy - 4,6 - dichloro - 16 - methylenepregna-4,6-diene-3,20-dione is mixed with the lactose and corn starch in a suitable mixer. The mixture is further blended by passing through a comminuting machine with a No. 1A screen with knives forward. The blended powder is returned to the mixer, the talc added and blended thoroughly. The mixture is then filled into No. 4 hard shell gelatin capsules on a capsulating machine.

Example 98

To a cooled (0°) solution of 3.40 g. of 4ξ,6,7ξ-trichloro-21 - acetoxy - 16 - methylpregna - 5,16 - diene - 3,11,20-trione in 140 ml. of methylene chlorine was added 26.0 g. of disodium hydrogen phosphate. To the stirred suspension was added rapidly 8.20 ml. of the peroxytrifluoroacetic acid solution (prepared by adding, over a 10 minute period, 5.1 ml. of trifluoroacetic acid to a cold solution of 0.82 ml. of 90% hydrogen peroxide in 5 ml. of methylene chloride). The reaction mixture was allowed to stir at 0° C. for 3.5 hours and was then diluted with 400 ml. of water. The resulting mixture was extracted twice with methylene chloride. The organic layers were washed once with water and once with brine, combined, dried (Na$_2$SO$_4$) and concentrated under reduced pressure to yield 3.60 g. of colorless oil.

The above oil was dissolved in 27 ml. of dry pyridine and was allowed to stand at room temperature for 90 minutes whereupon the pyridine was removed under reduced pressure. The residue was dissolved in methylene chloride and the organic solution was washed twice with 1 N hydrochloric acid solution, once with 5% sodium bicarbonate solution and once with brine. The organic layers were combined, dried (Na$_2$SO$_4$) and concentrated under reduced pressure to give 4,6-dichloro-21-acetoxy-16α,17α-oxido - 16β - methylpregna - 4,6 - diene-3,11,20-trione.

Example 99

To a warm solution of 2.50 g. of 4,6-dichloro-21-acetoxy-16α,17α-oxido-16β-methylpregna - 4,6-diene-3,11,20-trione in 60 ml. of dry benzene was added 12 ml. of trifluoroacetic acid. The reaction mixture was refluxed under nitrogen for 5 hours and was then diluted with 3:1 ether-methylene chloride. The organic layer was washed twice with 5% sodium bicarbonate solution and once with brine. The organic layers were combined, dried (Na$_2$SO$_4$) and concentrated under reduced pressure to yield a solid. Two crystallizations from methylene chloride-ethyl acetate gave 4,6-dichloro-21-acetoxy-17α-hydroxy-16-methylenepregna - 4,6 - diene-3,11,20-trione as colorless crystals, M.P. 267–270° C. Concentration of the mother liquor yielded additional product.

Example 100

A 0.90 molar solution (3.30 ml.) of chlorine in glacial acetic acid was added dropwise over two minutes, to a solution of 1.20 g. of 4,6-dichloro-21-acetoxy-16α,17α-oxido-16β-methylpregna-4,6-diene-3,11,20-trione in 20 ml. of glacial acetic acid. The reaction mixture was allowed to stand at room temperature for one hour and was then diluted with 75 ml. of water. The resulting precipitate was filtered, washed with water, and dried to yield 2,4,6-trichloro-21-acetoxy-16α,17α-oxido - 16β - methylpregna-4,6-diene-3,11,20-trione as a colorless solid.

Example 101

A solution of 1.00 g. of 2,4,6-trichloro-21-acetoxy-16α,17α-oxido - 16β - methylpregna - 4,6 - diene-3,11,20-trione in 25 ml. dry benzene and 5.0 ml. trifluoroacetic acid was refluxed under nitrogen for ten hours. The reaction mixture was cooled to room temperature and was diluted with 3:1 ether-methylene chloride. The mixture was washed twice with 5% sodium bicarbonate solution and once with brine. The organic layers were combined, dried (Na$_2$SO$_4$), and concentrated to yield an oil which was chromatographed over silica gel in benzene. Elutions with benzene:ethyl acetate and evaporation of the solvent gave the crude product. Crystallization from ethyl acetate-ether gave 2,4,6-trichloro - 21 - acetoxy-17α-hydroxy-16-methylene-pregna-4,6-diene - 3,11,20 - trione, M.P. 271–274°.

Example 102

To a stirred solution of 140 mg. of 2,4,6-trichloro-21-acetoxy-17α-hydroxy - 16 - methylenepregna - 4,6-diene-3,11,20-trione in 30 ml. of dry dimethylformamide was added 100 mg. of anhydrous lithium carbonate. The reaction mixture was allowed to stir and heat under nitrogen at 125° C. for 4 hours and at 151° C. for 15 minutes. The cooled reaction mixture was diluted with water and was extracted twice with methylene chloride. The organic layers were washed with brine, combined, dried (Na$_2$SO$_4$) and concentrated. The resulting oil (140 mg.) was dissolved in one ml. of pyridine and 0.20 ml. of acetic anhydride. The reaction mixture was allowed to stand at room temperature for three hours and was then diluted with cold 3 N hydrochloric acid. The mixture was extracted once with 3:1 ether-methylene chloride and once with methylene chloride. The organic layers were washed once with 1 N hydrochloric acid, once with 5% sodium bicarbonate solution and once with brine. The combined organic layers were dried (Na$_2$SO$_4$) and concentrated to yield an oil which was chromatographed on 10.0 g. of Florisil in benzene. Elution with benzene-ethyl acetate gave the product which was crystallized once from ethyl acetate:ether to yield 4,6-dichloro-21-acetoxy-17α-hydroxy-16-methylenepregna-1,4,6-triene-3,11,20-trione.

Example 103

To a mixture of 50.0 g. (0.115 mole) of 6-chloro-17α,21-dihydroxypregna - 4,6 - diene-3,11,20-trione-21-acetate, 1900 ml. of methanol and 500 ml. of water at room temperature was added 71.5 g. (0.64 mole) of semicarbazide hydrochloride and 89.5 ml. of pyridine. The reaction was then heated under reflux overnight. Approximately ⅓ of the solvents was removed under vacuum and the remainder was poured into 1500 ml. of water. The resulting precipitate was filtered, washed well with water and dried under reduced pressure to yield 62.6 g. of crude 3,20-bis-semicarbazone.

This material (62.6 g.) was mixed with 640 ml. of trifluoroacetic acid and the solution was heated under reflux for 80 min. The trifluoroacetic acid was evaporated under vacuum and the residue was mixed with 1280 ml. of 50% aqueous acetic acid, 128 ml. of 50% aqueous pyruvic acid and 62.6 g. of sodium acetate and heated on the steam bath for one hour. The reaction mixture was cooled to room temperature, diluted with 2900 ml. of ice water and extracted three times with dichloromethane. The organic layers were washed with water, 10% potassium bicarbonate solution and brine, dried and evaporated. The residue was dissolved in 292 ml. of pyridine and 59 ml. of acetic anhydride. The solution was allowed to stand at room temperature for 3 hr. and then in the refrigerator overnight, diluted with 2900 ml. of 3 N hydrochloric acid and 350 g. of ice, and extracted 3 times with dichloromethane. The organic layers were washed with 1 N hydrochloric acid, 5% sodium bicarbonate solution, and brine, dried and evaporated to give 50 g. of brown oil.

This crude product was dissolved in benzene and chromatographed over 500 g. of Florisil. Benzene and 20% ethyl acetate in benzene fractions were discarded and early 30% ethyl acetate in benzene fractions contained essentially pure (by TLC in 1:1 ethyl acetate:chloroform) product. Concentration of these factions gave 6-chloro-21-hydroxypregna-4,6,16-triene-3,11,20-trione acetate as a yellow oil suitable for further reaction. Crystallization of this oil from dichloromethane-ethyl acetate followed by recrystallization from dichloromethane-ether gave 6-chloro-21-hydroxypregna - 4,6,16 - triene-3,11,20-trione acetate as pale yellow crystals, M.P. 167–170°.

Example 104

A solution of diazomethane (from 105 g. of nitrosomethyl urea) in 1.5 l. of ether was added to a solution of 52.0 g. of 6-chloro-21-hydroxypregna-4,6,16-triene-3,11,20-trione acetate in 520 ml. of dry tetrahydrofuran over a ten minute period. The reaction mixture was allowed to stand at room temperature for 90 minutes whereupon a precipitate emerged. The solvent was removed under reduced pressure to give a yellow solid which was crystallized from methylene chloride-ether to yield 6-chloro - 21 - hydroxy - 16α,17α - methyleneazopregna-4,6-diene-3,11,20-trione acetate as yellow crystals, M.P. 194–197° (dec.). Crystallization from the same solvent gave the analytical sample, M.P. 194–195.5°.

Example 105

Twenty three grams of crystallized 6 - chloro - 21-hydroxy - 16α,17α-methyleneazopregna - 4,6 - diene-3,11,20-trione acetate in a one liter round bottom flask were heated at 180–190° under reduced pressure (~0.5 mm.) for 10 minutes. The reaction mixture was then cooled to room temperature and the resulting crude solid was crystallized from methylene chloride-ether to give 6-chloro-21 - hydroxy - 16 - methylpregna - 4,6,16 - triene-3,11,20-trione acetate. Crystallization from the same solvent system gave the analytical sample, M.P. 162–163.5°.

Example 106

To a cooled (0°) solution of 2.00 g. of 6 - chloro-21-hydroxy - 16 - methylpregna - 4,6,16 - triene - 3,11,20-trione acetate in 128 ml. of alcohol free chloroform was added 4.40 ml. of a 1.17 M solution of chlorine in carbon tetrachloride. The reaction mixture was allowed to stand at 0° for 50 min. and the solvent was then removed under reduced pressure. The resulting solid was crystallized from methylene chloride-ether to give 4ξ,6,7ξ-trichloro-21-hydroxy - 16 - methylpregna - 5,16 - diene - 3,11,20-trione acetate, M.P. 218–220° (dec). Crystallization from acetone gave the analytical sample, M.P. 222–224.5° (dec.); [α]$_D$—80.0° (c. 0.5, CHCl$_3$).

Example 107

To 3.0 ml. of dry pyridine was added 260 mg. of 4ξ,6,7ξ - trichloro - 21 - hydroxy - 16 - methylpregna-5,16-diene - 3,11,20 - trione acetate and the mixture was stirred for one hour at room temperature. The pyridine was then removed under reduced pressure and the residue was dissolved in 50 ml. of methylene chloride. The organic layer was washed twice with 1 N hydrochloric acid solution, once with 5% sodium bicarbonate solution and once with brine. The organic layer was dried (Na$_2$SO$_4$) and evaporated to dryness. The residue was crystallized from methylene chloride-ethyl acetate to give 4,6-dichloro-21- hydroxy - 16 - methylpregna - 4,6,16 - triene - 3,11,20-trione acetate, M.P. 196–200°. Crystallization from the same solvent system gave the analytical sample, M.P. 202–204°.

Example 108

To a solution cooled at 3° of 1.0014 g. (0.0023 mole) of 6-chloro-17,21-dihydroxypregna - 4,6 - diene - 3,11,20-trione 21 - acetate in 58 ml. of chloroform (left over alumina for 15 min. to remove ethanol) was added 3 drops of chloroform saturated with dry hydrochloric acid gas followed by 2.5 ml. of a 1.0 M solution (0.0025 mole) of chlorine in carbon tetrachloride. After 30 min. at 3°, 3 more drops of chloroform saturated with dry HCl gas was added. After 50 min. at 3° TLC and the ultraviolet spectrum indicated very little reaction had occurred. Dry HCl gas was bubbled through the reaction mixture for a few seconds at 3°. After 25 min., the ultraviolet spectrum showed the absence of starting material. The colorless solution was washed with 5% sodium bicarbonate solution, dried ($MgSO_4$) and concentrated under reduced pressure to yield a colorless foam. Two crystallizations from ethyl acetate-hexane gave 4ξ,6,7ξ - trichloro - 17α,21-dihydroxy - pregn - 5 - en - 3,11,20 - trione 21-acetate, M.P. 196–199°; [α]$_D$—23.1° (c. 1.2, $CHCl_3$).

Example 109

The trichloro compound 4ξ,6,7ξ - trichloro - 17α,21-dihydroxypregn - 5 - en - 3,11,20 - trione 21-acetate, (0.0446 g.) dissolved in 1 ml. of pyridine was left at 25° for 75 min., poured into 25 ml. of 1 N hydrochloric acid solution and the product was extracted with ethyl acetate. The extract was dried ($MgSO_4$) and concentrated under reduced pressure to yield a colorless solid. Crystallization from methylene chloride-ether gave 4,6 - dichloro-17,21-dihydroxypregna - 4,6 - diene -3,11,20 - trione 21-acetate, M.P. 258.5–261°.

Example 110

To a cooled (0°) solution of 5 g. (0.01234 mole) of 6 - chloro - 6 - dehydro - 17α - acetoxyprogesterone in 75 ml. of chloroform was added 12.5 ml. of a 1.04 M solution of chlorine in carbon tetrachloride. The reaction mixture was stirred at 0° for 0.5 hr. and the solvent was then removed under reduced pressure. The residue was treated with hexane (10 ml.) and the solvent was again removed under reduced pressure to give a light yellow foam. The residue was triturated with ether (25 ml.) and stored at 0° overnight. The precipitate was filtered to give crude product. In a similar manner, the residue was triturated with ether (several times) to give crude 4ξ,6,7ξ-trichloro-17α - hydroxy - pregn - 3 - ene-3,20-dione acetate. Crystallizations from ethyl acetate-cyclohexane gave the analytical sample, M.P. 205–207° (dec., shrinkage at 198°); [α]$_D$+133.81° (c. 1.3, $CHCl_3$).

Example 111

A solution of 150 mg. of 4ξ,6,7ξ - trichloro - 17α - hydroxypregn - 5 - ene - 3,20 - dione acetate in 0.4 ml. of dry pyridine was allowed to stand at room temperature for 2 hr. The pale yellow solution was poured into 50 ml. of ether and the ether solution was extracted several times with 1 N sulfuric acid solution. The dried ($MgSO_4$) ether solution was evaporated and the residue was triturated with ether to give product, M.P. 228–235°. Crystallization from methylene chloride-ether gave 4,6 - dichloro - 17α-hydroxypregna - 4,6 - diene - 3,20 - dione acetate, M.P. 238–240°.

Example 112

To a cooled (0°) solution of 2.5 g. (0.0069 mole) of 6-chloro - 17β - hydroxyandrosta - 4,6 - dien - 3 - one acetate in 50 ml. of chloroform was added 7.22 ml. of a 1.04 M solution of chlorine in carbon tetrachloride. The reaction mixture was stirred at 0° for 0.5 hr. and the solvent was then removed under reduced pressure. Ether was added to the residue and the solvent was again evaporated. The residue was then triturated with ether to give crude product. This material was crystallized from methylene chloride-ether to give 17β-hydroxy-4ξ,6,7ξ-trichloroandrost - 5 - en - 3 - one acetate, M.P. 225–230° dec., [α]$_D$ —127.33° (c. 1.3, $CHCl_3$).

Example 113

To a solution of lithium tri-t-butoxyaluminum hydride (0.352 g., 0.00138 mole) in 5 ml. of dry tetrahydrofuran was added at 0° a solution of 0.3 g. (0.000692 mole) of 17β - hydroxy - 4ξ,6,7ξ - trichloroandrost - 5 - en - 3 - one acetate in 3 ml. of dry tetrahydrofuran. The reaction mixture was stirred at 0° for 1 hr. and the solvent was then removed under reduced pressure. Methylene chloride was added to the residue and the mixture was made acidic to pH 6. The methylene chloride solution was dried and the solvent removed under reduced pressure. Crystallization from methylene chloride-ether gave 3ξ,17β - dihydroxy-4ξ,6,7ξ - trichloroandrost - 5 - ene - 17 - acetate, M.P. 197–202° dec.; [α]$_D$ —197.22° (c. 1.1 $CHCl_3$).

Example 114

To a cooled (0°) solution of 3.0408 g. (0.00729 mole) of 6 - chloro - 17α-hydroxy-16-methylenepregna-4,6-dien-3,20-dione acetate in 50 ml. of chloroform was added 9.5 ml. of a 0.88 M solution of chlorine in carbon tetrachloride. The reaction mixture was stirred at 0° for 0.75 hr. and the solvent was then removed under reduced pressure. The residue was treated with hexane (10 ml.) and the solvent was again removed under reduced pressure to give a light yellow foam. The residue was triturated with ether (25 ml.) and stored at room temperature overnight. The precipitate was filtered to give the crude product 4ξ,6,7ξ-trichloro-17α-hydroxy-16-methylenepregn-5-ene-3,20-dione acetate. Crystallization once from methylene chloride-ether and twice from ethyl acetate gave the product 4ξ,6,7ξ-trichloro-17α-hydroxy-16-methylenepregn-5-ene-3,20-dione acetate, M.P. 198–202° (dec.); UV max. ($C_2H_5OH$) 239 mμ (ε 5,270).

Example 115

To 1.8 g. of 4,6-dichloro-3β,17α-dihydroxy-16-methylenepregna-4,6-diene-20-one 17-acetate in 75 ml. of methanol at room temperature under nitrogen was added 1.8 g. of potassium hydroxide dissolved in 2 ml. of water. After stirring at room temperature for 6 hrs., 50 ml. of water was added and most of the solvent was removed at reduced pressure. The crystalline solid was removed by filtration and dried to yield 1.6 g. of 4,6-dichloro-3β,17α-dihydroxy - 16 - methylenepregna - 4,6 - diene - 20 - one. Crystallization from methylene chloride-ether gave the pure compound.

Example 116

To 1.0 g. of 4,6-dichloro-3β,17α-dihydroxy-16-methylenepregna-4,6-diene-20-one in 40 ml. of chloroform was added 5.0 g. of activated manganese dioxide. The suspension was stirred vigorously at room temperature for 5 hrs. and then the manganese dioxide was removed by filtration through Celite. The filtrate was concentrated to dryness to yield 4,6-dichloro-17α-hydroxy-16-methylenepregna-4,6-diene-3,20-dione; UV max. ($C_2H_5OH$) 300 mμ (ε 18,400).

Example 117

A solution of 4,6 - dichloro - 17α - hydroxy - 16 - methylenepregna - 4,6 - diene - 3,2 - dione acetate (8.3 g., 0.0184 mole) and phenyltrimethylammonium perbromide (7.6 g.; 0.0202 mole) in 100 ml. of dry tetrahydrofuran was stirred overnight at room temperature. The solvent was removed under reduced pressure and the residue was treated with sodium thiosulfate solution. The mixture was extracted with methylene chloride and the dried ($MgSO_4$) organic layer was evaporated. The residual oil was triturated with ether to give 6 g. of crude 2-bromo derivative, M.P. 195–200° (dec). A mixture of the 2-bromo derivative (6 g.), lithium chloride (2.4 g.) and 50 ml. of dimethylformamide was refluxed for 0.5 hr. The solution was poured onto 200 g. of crushed ice and the precipitate was filtered. The product was dissolved in methylene chloride and the dried (MgSO$_4$) solution was evaporated under reduced pressure. The residue triturated with ether to give 2.6 g. of product, M.P. 225–228°. The mother liquor was evaporated under reduced pressure and the residue was dissolved in a minimum of methylene chloride. This solution was washed through 30 g. of neutral alumina with 500 ml. of methylene chloride. The solvent was evaporated and the residue was triturated with ether to give an additional 1.0 g. of 4,6-dichloro - 17α - hydroxy - 16 - methylenepregna - 1,4,6-triene-3,20-dione acetate, M.P. 223–225°.

Example 118

To a solution of 2.5 g. of potassium hydroxide in 100 ml. of methanol was added 2.5 g. of 4,6-dichloro-17α-hydroxy - 16 - methylenepregna - 1,4,6-triene-3,20-dione acetate. After approximately 10 minutes solution occurred. After stirring at room temperature for 1.5 hr. (precipitation of product began approximately 0.5 hr. after solution occurred), a solution of 8 g. of potassium dihydrogen phosphate in 150 ml. of water was added. The precipitate was filtered and dried overnight under vacuum. The product was dissolved in a minimum of acetone, dried (MgSO$_4$), decolorized (charcoal) and filtered. Hexane was added to the filtrate and the solvent was removed at atmospheric pressure until crystallization occurred. This procedure gave 1.3 g. of 4,6-dichloro-17α-hydroxy-16 - methylenepregna - 1,4,6-triene-3,20-dione, M.P. 258–260°. A second crop (0.6 g.) of product obtained from the mother liquors had M.P. 256–258°.

I claim:
1. A compound of the formula

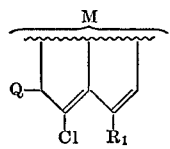

wherein $R_1$ is halogen of atomic weight less than 100 or lower alkyl; Q is oxo, hydroxy, lower alkanoyloxy or 1,2-alkylenedioxy of 2 to 4 carbon atoms; and M is a moiety of the formula

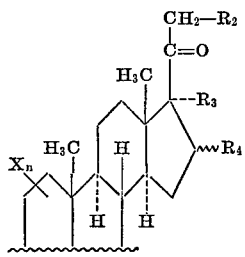

wherein $R_2$ is hydrogen or fluorine; $R_3$ is individually hydrogen, hydroxy, lower alkoxy, lower alkanoyloxy, difluoro- or dichloroacetyloxy, or lower alkyl; $R_4$ is individually hydrogen, lower alkylidene d-halomethyl or lower alkyl or, taken together with $R_3$, a moiety of the formula

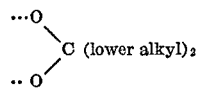

X is an unsaturation between the 1- and 2-position, 2-chloro or a 1α,2α-methylene moiety; and $n$ is a whole integer from 0 to 1;

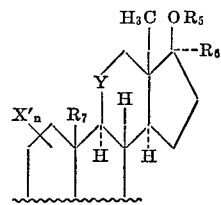

wherein $R_5$ is hydrogen or lower alkanoyl; $R_6$ is hydrogen, lower alkyl, mono-unsaturated lower alkyl or mono-unsaturated halo-lower alkyl; $R_7$ is hydrogen or methyl; X' is 2-chloro or an unsaturation between the 1- and 2-position; $n$ is a whole integer from 0 to 1; and Y is

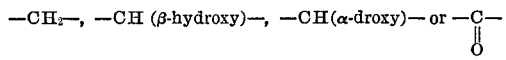

provided that when X' is an unsaturation, $R_7$ is methyl;

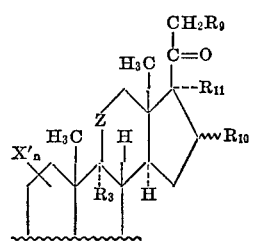

wherein $R_8$ is individually hydrogen or halogen of atomic weight less than 100; $R_9$ is individually hydrogen, hydroxy, the dihydrogen phosphate ester thereof or alkali metal salts thereof, or lower alkanoyloxy; $R_{10}$ is individually hydrogen, α-hydroxy, lower alkylidene, α-halomethyl, α-halo or lower alkyl; $R_{11}$ is individually lower alkanoyloxy, hydroxy or, taken together with $R_{10}$, a moiety of the formula

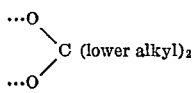

or, taken together with $R_9$, a moiety of the formula

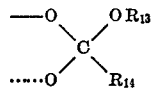

X' is an unsaturation between the 1- and 2-position or 2-chloro; $n$ is a whole integer from 0 to 1; Z is individually

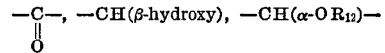

or when $R_8$ is chlorine, —CH(β-chlorine)—, or, taken together with $R_8$, is an unsaturation between the 9- and 11-position or a 9,11-oxido moiety; $R_{12}$ is hydrogen or sulfonyloxy; and $R_{13}$ and $R_{14}$ is each independently lower alkyl.

2. A compound as in claim 1 which is of the formula

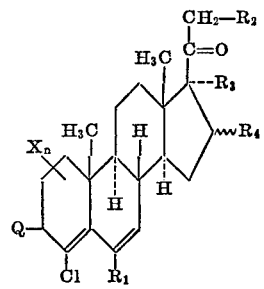

wherein Q, $R_1$, $R_2$, $R_3$, $R_4$, X and $n$ each has the same meaning as in claim 1.

3. A compound as in claim 1 which is of the formula

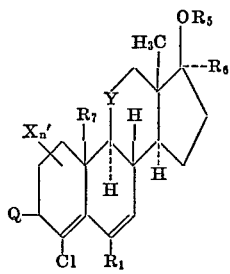

wherein Q, $R_1$, $R_5$, $R_6$, $R_7$, Y, X' and $n$ each has the same meaning as in claim 1.

4. A compound as in claim 1 which is of the formula

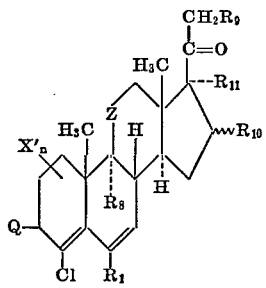

wherein Q, $R_1$, $R_8$, $R_9$, $R_{10}$, $R_{11}$, Z, X' and $n$ each has the same meaning as in claim 1.

5. A compound as in claim 2 wherein Q is oxo, hydroxy, acetoxy or ethylenedioxy; $R_1$ is chlorine or fluorine; $R_3$ is lower alkanoyloxy, lower alkoxy or lower alkyl; $R_4$ is hydrogen, methylene, ethyl or methyl; X is an unsaturation between the 1- and 2-position and $R_2$ and $n$ each has the same meaning as in claim 2.

6. A compound as in caim 5 which is 17α-acetoxy-4,6-dichloropregna-4,6-diene-3,20-dione.

7. A compound as in claim 5 which is 17α-acetoxy-4,6-dichloro-3-ethylenedioxypregna-4,6-diene-20-one.

8. A compound as in claim 5 which is 17α-hydroxy-4,6-dichloropregna-4,6-diene-3,20-dione.

9. A compound as in claim 2 which is 4,6-dichloropregna-4,6-diene-3,20-dione.

10. A compound as in claim 5 which is 17α-acetoxy-4,6-dichloropregna-1,4,6-triene-3,20-dione.

11. A compound as in claim 5 which is 17α-acetoxy-4,6-dichloropregna-4,6-diene-3β-ol-20-one.

12. A compound as in claim 5 which is 3β,17α-diacetoxy-4,6-dichloropregna-4,6-diene-20-one.

13. A compound as in claim 5 which is 4,6-dichloro-3β,17α-dihydroxy-16-methylenepregna-4,6-diene - 20 - one-17-acetate.

14. A compound as in claim 5 which is 4,6-dichloro-17α-acetoxy-16-methylenepregna-4,6-diene-3,20-dione.

15. A compound as in claim 5 which is 4,6-dichloro-3β,17α-diacetoxy-16-methylenepregna-4,6-diene-20-one.

16. A compound as in claim 5 which is 4,6-dichloro-17α-acetoxy-16-methylenepregna-1,4,6-triene-3,20-dione.

17. A compound as in claim 3 wherein $R_6$ is mono-unsaturated lower alkyl or mono-unsaturated halo-lower alkyl; X' is an unsaturation between the 1- and 2-position and Q, $R_1$, $R_5$, $R_7$, Y and $n$ each has the same meaning as in claim 3.

18. A compound as in claim 17 wherein Q is oxo, hydroxy, acetoxy or ethylenedioxy; $R_1$ is chlorine or fluorine; $R_5$ is hydrogen or lower alkanoyl; $R_6$ is ethynyl, 2-chloroethynyl, allyl, 2-methallyl or propynyl; $R_7$ is hydrogen or methyl; Y is —$CH_2$— and X' and $n$ each has the same meaning as in claim 17.

19. A compound as in claim 18 which is 17α-ethynyl-4,6-dichloro-17β-hydroxy-19-nor-androsta-4,6 - diene - 3-one.

20. A compound as in claim 18 which is 4,6-dichloro-3β,17β-dihydroxy-19-nor-17α-pregna-4,6-diene-20-yne.

21. A compound as in claim 18 which is 4,6-dichloro-3β,17β-dihydroxy-19-nor-17α-pregna-4,6-diene-20-yne diacetate.

22. A compound as in claim 3 wherein $R_6$ is hydrogen or lower alkyl; X' is an unsaturation between the 1- and 2-position and Q, $R_1$, $R_5$, $R_7$, Y and $n$ each has the same meaning as in claim 3.

23. A compound as in claim 4 wherein X' is an unsaturation between the 1- and 2-position; Z is —CO—, —CH(β-hydroxy)— or —CH(β-chlorine)— and Q, $R_1$, $R_8$, $R_9$, $R_{10}$, $R_{11}$ and $n$ each has the same meaning as in claim 4.

24. A compound as in claim 23 wherein Q is oxo, hydroxy, acetoxy or ethylenedioxy; $R_1$ is chlorine or fluorine; $R_8$ is halogen; $R_9$ is the dihydrogen phosphate ester or lower alkanoyloxy; $R_{10}$ is hydrogen, α-hydroxy, methylene, methyl or ethyl; $R_{11}$ is hydroxy or, taken together with $R_{10}$, 2,2-isopropylenedioxy; $n$ is 0 and Z is —CH(β-hydroxy)—

25. A compound of one of the formulas

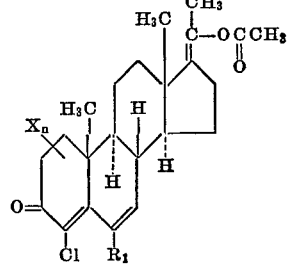

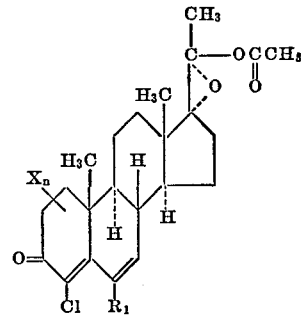

wherein $R_1$, X and $n$ have the same meaning as in claim 1.

26. A method for preparing a 4-chloro-6-$R_1$-4,6-dien-3-one steroid wherein $R_1$ is halogen of atomic weight less than 100 to lower alkyl; which comprises treating a 6-$R_1$-4,6-dien-3-one steroid with chlorine either in the presence of an N,N-dilower alkyl lower alkanoyl amide or a lower alkylene oxide or followed by the addition of N,N-dilower alkyl lower alkanoyl amides, lower alkylene oxides or a nitrogen containing heterocyclic base.

27. A method as in claim 26 wherein $R_1$ is chlorine, fluorine or methyl.

28. A compound as in claim 5 wherein $R_4$ is methyl and is in the α-configuration.

29. A compound as in claim 28 wherein Q is oxo, $R_1$ is chlorine, $R_3$ is acetoxy, $R_2$ is hydrogen, X is an unsaturation between the 1- and 2-position and $R_4$ and $n$ have the same meaning as in claim 28.

30. A compound as in claim 29 which is 17α-acetoxy-4,6-dichloro-16α-methylpregna-4,6-diene-3,20-dione.

31. A compound as in claim 2 of the formula:

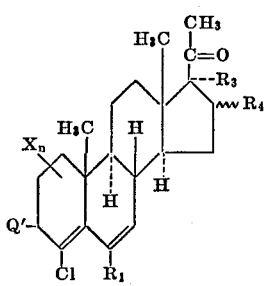

wherein Q' is ethylenedioxy, acetoxy, oxo or hydroxy; $R_3$ is lower alkanoyloxy or hydroxy; $R_4$ is hydrogen, methylene or methyl; $R_1$ is chlorine or fluorine; X is an unsaturated bond between the 1- and 2-position and $n$ is a whole integer from 0 to 1.

32. A compound as in claim 31 wherein $R_4$ is hydrogen, or methylene, $n$ is 0 and $R_3$ is acetoxy and Q' is as defined therein.

33. A compound as in claim 3 of the formula:

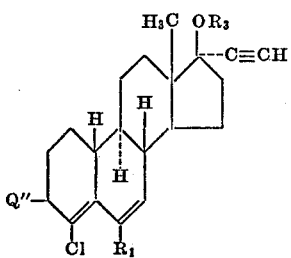

wherein $R_5$ is hydrogen or acetate, Q'' is acetoxy, oxo or hydroxy and $R_1$ is chlorine or fluorine.

34. A compound of the formula

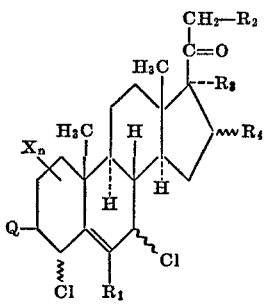

wherein Q is hydroxy, lower alkanoyloxy or 1,2-alkylenedioxy; $R_1$ is halogen of atomic weight less than 100 or lower alkyly; $R_2$ is hydrogen or fluorine; $R_3$ is individually hydrogen, hydroxy, lower alkoxy, lower alkanoyloxy, difluoro- or dichloroacetyloxy, or lower alkyl; $R_4$ is individually hydrogen, lower alkylidene α-halomethyl or lower alkyl, or, taken together with $R_3$, a moiety of the formula

X is an unsaturation between the 1- and 2-position, 2-chloro or a 1α,2α-methylene moiety; and $n$ is a whole integer from 0 to 1.

35. A compound of the formula

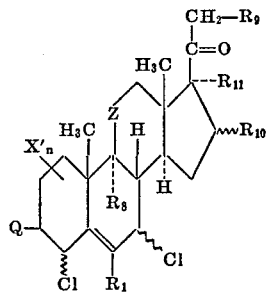

wherein Q is hydroxy, lower alkanoyloxy or 1,2-alkylenedioxy; $R_1$ is halogen of atomic weight less than 100 or lower alkyl; $R_8$ is individually hydrogen or halogen of atomic weight less than 100; $R_9$ is individually hydrogen, hydroxy, the dihydrogen phosphate ester thereof or alkali metal salts thereof, or lower alkanoyloxy; $R_{10}$ is individually hydrogen, α-hydroxy, lower alkylidene, α-halo or lower alkyl; $R_{11}$ is individually lower alkanoyloxy, hydroxy, or, taken together with $R_{10}$, a moiety of the formula

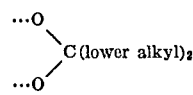

or, taken together with $R_9$, a moiety of the formula

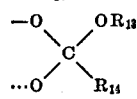

Z is individually

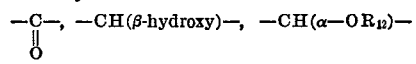

or when $R_8$ is chlorine, —CH(β-chlorine)— or, taken together with $R_8$, is an unsaturation between the 9- and 11-position or a 9,11-oxido moiety; X' is an unsaturation between the 1- and 2-position or 2-chloro; and $n$ is a whole integer from 0 to 1.

36. A compound as in claim 34 wherein Q, X, $n$, $R_2$ and $R_3$ are as therein defined; $R_1$ is chlorine or fluorine; and $R_4$ is lower alkylidene or taken together with $R_3$, a moiety of the formula

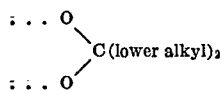

37. A compound as in claim 34 which is 4ξ,6,7ξ-trichloro-17α-hydroxy-16-methylenepregn-5-ene-3,20-dione.

38. A compound as in claim 35 wherein $R_9$ is lower alkanoyloxy, hydrogen or hydroxy; $R_{10}$ is hydrogen, α-hydroxy, methylene, methyl or ethyl; $R_{11}$ is lower alkanoyloxy, hydroxy; Z is —CO—, —CH(β-hydroxy)— or —CH(β-chlorine)—; Q is oxo, hydroxy, acetoxy or ethylenedioxy; $R_8$ is hydrogen; X' is an unsaturation between the 1- and 2-position; and $n$ is a whole integer from 0 to 1.

39. A method for preparing a 4-chloro-6-$R_1$-7-chloro-Δ⁵-3-one steroid wherein $R_1$ is halogen of atomic weight less than 100 or lower alkyl which comprises treating a 6-$R_1$-4,6-diene-3-one steroid with chlorine in an inert organic solvent.

40. A method for preparing a 4-chloro-6-$R_1$-4,6-diene-3-one steroid wherein $R_1$ is halogen of atomic weight less than 100 or lower alkyl which comprises treating a 4ξ,7ξ-dichloro-6-$R_1$-Δ⁵- steroid with a dehydrochlorinating agent selected from the group consisting of nitrogen-containing heterocyclic bases, trilower alkyl amines, alkali metal hydroxides, alkali metal bicarbonates, dimethylsulfoxide, hydrohalic acids, N,N-dilower alkyl lower alkanoyl amides.

41. A compound as in claim 34, which is,

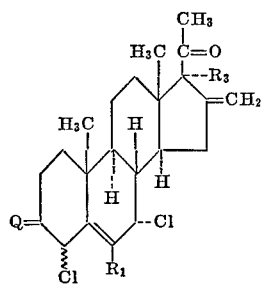

wherein Q and $R_3$ are defined as in claim 40, and $R_1$ is chlorine or fluorine.

42. A compound as in claim 4 which is 4,6-dichloro-17α,21 - dihydroxy - 16 - methylenepregna - 4,6 - diene-3,11,20-trione 21-acetate.

43. A compound of the formula

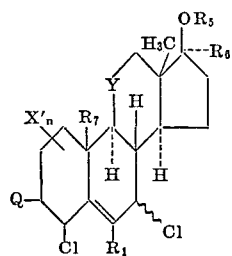

wherein Q is oxo, hydroxy, lower alkanoyloxy or 1,2-alkylenedioxy or 2 to 4 carbon atoms; $R_1$ is halogen of atomic weight less than 100 or lower alkyl; $R_5$ is hydrogen or lower alkanoyl; $R_6$ is hydrogen, lower alkyl, mono-unsaturated lower alkyl or mono-unsaturated halo-lower alkyl; $R_7$ is hydrogen or methyl; Y is —CH$_2$—, —CH(β-hydroxy)—, —CH(α-hydroxy)— or

provided that when X' is an unsaturation, $R_7$ is methyl; X' is 2-chloro or an unsaturation between the 1- and 2-position; and $n$ is a whole integer from 0 to 1.

44. A compound of the formula

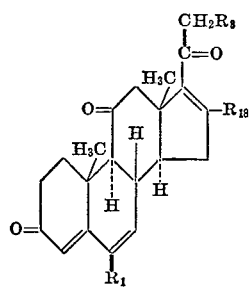

wherein $R_1$ is halogen of atomic weight less than 100 or lower alkyl; $R_9$ is hydrogen, hydroxy, the dihydrogen phosphate ester thereof or alkali metal salts thereof or lower alkanoyloxy and $R_{18}$ is hydrogen or lower alkyl.

45. A compound as in claim 44 wherein $R_1$ is chlorine or fluorine; $R_9$ is lower alkanoyloxy and $R_{18}$ is as defined therein.

46. A compound of the formula

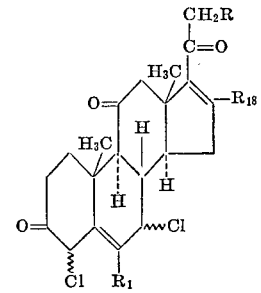

wherein $R_1$ is halogen of atomic weight less than 100 or lower alkyl; $R_9$ is hydrogen, hydroxy, the dihydrogen phosphate ester thereof or alkali metal salts thereof or lower alkanoyloxy and $R_{18}$ is hydrogen or lower alkyl.

47. A compound as in claim 46 wherein $R_1$ is chlorine or fluorine; $R_9$ is lower alkanoyloxy and $R_{18}$ is as defined therein.

48. A compound of the formula

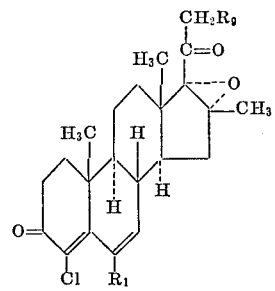

wherein $R_1$ is halogen of atomic weight less than 100 or lower alkyl; and $R_9$ in hydrogen, hydroxy, the dihydrogen phosphate ester thereof or alkali metal salts thereof or lower alkanoyloxy.

49. A compound as in claim 48 wherein $R_1$ is chlorine or fluorine; and $R_9$ is lower alkanoyloxy.

50. Compounds of the formula

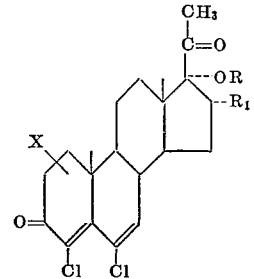

wherein R is an acyl group derived from a lower hydrocarbon carboxylic acid; $R_1$ is selected from the group consisting of hydrogen and methyl and X is selected from the group consisting of a single bond, double bond or alpha methylene group between carbon atoms C–1 and C–2.

References Cited
UNITED STATES PATENTS
3,138,589   6/1964   Ringold et al. _____ 260—239.55

HENRY A. FRENCH, Primary Examiner

U.S. Cl. X.R.

260—239.55 R, 239.55 D, 397.3, 397.4, 397.45, 397.47, 397.5; 424—243

UNITED STATES PATENT OFFICE
CERTIFICATE OF CORRECTION

Patent No. 3,707,537  Dated December 26, 1972

Inventor(s) Richard Wightman Kierstead

It is certified that error appears in the above-identified patent and that said Letters Patent are hereby corrected as shown below:

Inventors middle name "Wrightman" should be

Wightman

Column 47, line 67  "d-halomethyl"  should be

α-halomethyl

Column 48, line 17  "-CH(α-droxy)"  should be

-CH(α-hydroxy)

Column 51, line 62  "alkyly"  should be alkyl

Column 51, line 68  "...O\\>C"  should be

...O\\>C(lower alkyl)$_2$;

UNITED STATES PATENT OFFICE
CERTIFICATE OF CORRECTION

Patent No. __3,707,537__ Dated _____

Inventor(s) _____

It is certified that error appears in the above-identified patent and that said Letters Patent are hereby corrected as shown below:

Column 54, line 36    "in"    should be

<u>is</u>

Signed and sealed this 31st day of July 1973.

(SEAL)
Attest:

EDWARD M. FLETCHER, JR.　　　　　RENE D. TEGTMEYER
Attesting Officer　　　　　　　　　Acting Commissioner of Patents